(12) United States Patent
Peters et al.

(10) Patent No.: US 12,116,452 B2
(45) Date of Patent: Oct. 15, 2024

(54) CRYSTALLIZABLE SHRINKABLE FILMS AND THERMOFORMABLE SHEETS MADE FROM RESINS BLENDS

(71) Applicant: Eastman Chemical Company, Kingsport, TN (US)

(72) Inventors: Mark Allen Peters, Jonesborough, TN (US); Jacob E. Napierala, Johnson City, TN (US); Rondell Paul Little, Jr., Johnson City, TN (US); James Carl Williams, Blountville, TN (US); James Wesley Peer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 140 days.

(21) Appl. No.: 17/250,975

(22) PCT Filed: Oct. 8, 2019

(86) PCT No.: PCT/US2019/055092
§ 371 (c)(1),
(2) Date: Apr. 6, 2021

(87) PCT Pub. No.: WO2020/076749
PCT Pub. Date: Apr. 16, 2020

(65) Prior Publication Data
US 2021/0395446 A1 Dec. 23, 2021

Related U.S. Application Data

(60) Provisional application No. 62/782,626, filed on Dec. 20, 2018, provisional application No. 62/742,726, filed on Oct. 8, 2018.

(51) Int. Cl.
| | | |
|---|---|---|
| C08G 63/183 | (2006.01) | |
| B29C 55/00 | (2006.01) | |
| B29C 55/04 | (2006.01) | |
| B29K 67/00 | (2006.01) | |
| C08G 63/199 | (2006.01) | |
| C08G 63/672 | (2006.01) | |

(52) U.S. Cl.
CPC .......... *C08G 63/183* (2013.01); *B29C 55/005* (2013.01); *B29C 55/04* (2013.01); *C08G 63/199* (2013.01); *C08G 63/672* (2013.01); *B29K 2067/003* (2013.01); *B29K 2995/0049* (2013.01); *B29K 2995/0051* (2013.01); *B29K 2995/0097* (2013.01)

(58) Field of Classification Search
CPC .. C08G 63/183; C08G 63/199; C08G 63/672; C08L 2205/025; C08L 2205/03; C08L 67/02; C08L 67/025; B29C 55/005; B29C 55/04; B29D 7/01; B29K 2067/00; B29K 2067/003; B29K 2995/0049; B29K 2995/0051; B29K 2995/0097; C08J 2367/02; C08J 2467/02; C08J 5/18
See application file for complete search history.

(56) References Cited

U.S. PATENT DOCUMENTS

| | | |
|---|---|---|
| 2,720,507 A | 10/1955 | Caldwell |
| 3,426,754 A | 2/1969 | Bierenbaum et al. |
| 3,772,405 A | 11/1973 | Hamb |
| 3,944,699 A | 3/1976 | Mathews et al. |
| 4,138,459 A | 2/1979 | Brazinsky et al. |
| 4,578,437 A | 3/1986 | Light et al. |
| 4,582,752 A | 4/1986 | Duncan |
| 4,632,869 A | 12/1986 | Park et al. |
| 4,705,707 A | 11/1987 | Winter |
| 4,770,931 A | 9/1988 | Pollock et al. |
| 4,835,218 A | 5/1989 | Yoshimura et al. |
| 4,939,232 A | 7/1990 | Fukuda et al. |
| 4,985,538 A | 1/1991 | Fukuda et al. |
| 4,996,291 A | 2/1991 | Yoshinaka et al. |
| 5,023,143 A | 6/1991 | Nelson |
| 5,176,954 A | 1/1993 | Keller et al. |
| 5,336,552 A | 8/1994 | Strack et al. |
| 5,340,624 A | 8/1994 | Sublett |
| 5,372,864 A | 12/1994 | Weaver et al. |

(Continued)

FOREIGN PATENT DOCUMENTS

| | | |
|---|---|---|
| EP | 0 214 859 A2 | 3/1987 |
| EP | 0 581 970 A1 | 2/1994 |

(Continued)

OTHER PUBLICATIONS

US 9,951,203 B2, 04/2018, Akahira et al. (withdrawn)
Notification of Transmittal of the International Search Report and the Written Opinion of the International Searching Authority, or the Declaration date of mailing Apr. 8, 2019 received in International Application No. PCT/US2018/065089.
Notification of Transmittal of the International Search Report and the Written Opinion of the International Searching Authority, or the Declaration date of mailing Dec. 19, 2019 received in International Application No. PCT/US2019/055089.

(Continued)

*Primary Examiner* — Frances Tischler
*Assistant Examiner* — Gennadiy Mesh
(74) *Attorney, Agent, or Firm* — Tammye L. Taylor Polk

(57) ABSTRACT

A blend composition comprising a first polyester and a second polyester. The first and second polyesters each comprises residues of terephthalic acid, neopentyl glycol (NPG), 1,4-cyclohexanedimethanol (CHDM), ethylene glycol (EG), and/or diethylene glycol (DEG). The first polyester comprises NPG, CHDM, and DEG in a combined amount that is less than the second polyester. The blend composition can be useful for producing a shrink film exhibiting high ultimate shrinkage (e.g., >65% at 95° C. for 10 seconds) and a high strain induced crystalline melting point (e.g., greater than 190° C.).

6 Claims, 2 Drawing Sheets

(56) References Cited

U.S. PATENT DOCUMENTS

| | | |
|---|---|---|
| 5,384,377 A | 1/1995 | Weaver et al. |
| 5,385,773 A | 1/1995 | Yau et al. |
| 5,435,955 A | 7/1995 | Kamei et al. |
| 5,567,758 A | 10/1996 | Kinami et al. |
| 5,573,820 A | 11/1996 | Harazoe et al. |
| 5,589,126 A | 12/1996 | Shih et al. |
| 5,654,347 A | 8/1997 | Khemani et al. |
| 5,658,626 A | 8/1997 | Kuze et al. |
| 5,668,243 A | 9/1997 | Yau et al. |
| 5,668,899 A | 9/1997 | Jadrich |
| 5,696,176 A | 12/1997 | Khemani et al. |
| 5,744,571 A | 4/1998 | Hilbert et al. |
| 5,753,377 A | 5/1998 | Takahashi et al. |
| 5,824,398 A | 10/1998 | Shih |
| 5,843,578 A | 12/1998 | Sasaki et al. |
| 5,852,164 A | 12/1998 | Akai et al. |
| 5,858,507 A | 1/1999 | Yoshida et al. |
| 5,859,116 A | 1/1999 | Shih |
| 5,922,164 A | 7/1999 | Kimura et al. |
| 5,932,685 A | 8/1999 | Mori et al. |
| 5,972,445 A | 10/1999 | Kimura et al. |
| 5,985,387 A | 11/1999 | Mori et al. |
| 6,004,664 A | 12/1999 | Sasaki et al. |
| 6,068,910 A | 5/2000 | Flynn et al. |
| 6,086,989 A | 7/2000 | Kubo et al. |
| 6,120,889 A | 9/2000 | Turner et al. |
| 6,139,954 A | 10/2000 | Dean et al. |
| 6,197,430 B1 | 3/2001 | Asakura et al. |
| 6,231,958 B1 | 5/2001 | Kim et al. |
| 6,242,560 B1 | 6/2001 | Gyobu et al. |
| 6,270,866 B1 | 8/2001 | Okuda et al. |
| 6,287,656 B1 | 9/2001 | Turner et al. |
| 6,287,667 B1 | 9/2001 | Kinoshita et al. |
| 6,287,680 B1 | 9/2001 | Sasaki et al. |
| 6,306,496 B1 | 10/2001 | Endo et al. |
| 6,342,281 B2 | 1/2002 | Hayakawa et al. |
| 6,362,306 B1 | 3/2002 | Shelby et al. |
| 6,383,627 B2 | 5/2002 | Hashimoto et al. |
| 6,413,596 B1 | 7/2002 | Okuda et al. |
| 6,447,925 B1 | 9/2002 | Tabota et al. |
| 6,451,445 B1 | 9/2002 | Ito et al. |
| 6,458,437 B1 | 10/2002 | Ito et al. |
| 6,465,063 B1 | 10/2002 | Hayakawa et al. |
| 6,485,810 B1 | 11/2002 | Uchida et al. |
| 6,500,533 B1 | 12/2002 | Kong et al. |
| 6,503,599 B1 | 1/2003 | Tojo et al. |
| 6,548,595 B2 | 4/2003 | Ito et al. |
| 6,551,688 B2 | 4/2003 | Moskala et al. |
| 6,551,699 B1 | 4/2003 | Flynn |
| 6,599,994 B2 | 7/2003 | Shelby et al. |
| 6,616,998 B2 | 9/2003 | Greer et al. |
| 6,653,440 B2 | 11/2003 | Hirokane et al. |
| 6,663,928 B2 | 12/2003 | Ito et al. |
| 6,720,085 B2 | 4/2004 | Ito et al. |
| 6,761,966 B2 | 7/2004 | Ito et al. |
| 6,765,070 B2 | 7/2004 | Tamura et al. |
| 6,846,440 B2 | 1/2005 | Flynn et al. |
| 6,863,939 B2 | 3/2005 | Laney et al. |
| 6,902,819 B2 | 6/2005 | Kim et al. |
| 6,939,616 B2 | 9/2005 | Hayakawa et al. |
| 6,958,178 B2 | 10/2005 | Hayakawa et al. |
| 7,001,651 B2 | 2/2006 | Hayakawa et al. |
| 7,008,698 B2 | 3/2006 | Marlow et al. |
| 7,037,576 B2 | 5/2006 | Willham et al. |
| 7,074,467 B2 | 7/2006 | Kim et al. |
| 7,078,105 B2 | 7/2006 | MacKerron |
| 7,078,476 B2 | 7/2006 | Woong et al. |
| 7,128,863 B2 | 10/2006 | Kim et al. |
| 7,129,317 B2 | 10/2006 | Moore et al. |
| 7,166,342 B2 | 1/2007 | Hayakawa et al. |
| 7,198,857 B2 | 4/2007 | Kumano et al. |
| 7,247,698 B2 | 7/2007 | Denis et al. |
| 7,250,485 B2 | 7/2007 | Ito et al. |
| 7,261,934 B2 | 8/2007 | Kusume et al. |
| 7,273,894 B2 | 9/2007 | Shelby et al. |
| 7,279,123 B2 | 10/2007 | Flynn et al. |
| 7,279,204 B2 | 10/2007 | Ito et al. |
| 7,306,835 B2 | 12/2007 | Hong et al. |
| 7,349,317 B2 | 3/2008 | Maeda et al. |
| 7,399,518 B2 | 7/2008 | Ito et al. |
| 7,438,841 B2 | 10/2008 | Flynn et al. |
| 7,439,317 B2 | 10/2008 | Suzuki et al. |
| 7,501,373 B1 | 3/2009 | Nakajima et al. |
| 7,514,141 B2 | 4/2009 | Klein et al. |
| 7,582,369 B2 | 9/2009 | Kobayashi et al. |
| 7,687,594 B2 | 3/2010 | Hung et al. |
| 7,749,584 B2 | 7/2010 | Hayakawa et al. |
| 7,829,655 B2 | 11/2010 | Endo et al. |
| 7,939,174 B2 | 5/2011 | Hayakawa et al. |
| 8,093,316 B2 | 1/2012 | Pearson et al. |
| 8,206,797 B2 | 6/2012 | Haruta et al. |
| 8,263,731 B2 | 9/2012 | Liu et al. |
| 8,304,510 B2 | 11/2012 | Thompson et al. |
| 8,318,893 B2 | 11/2012 | Hoshino et al. |
| 8,329,828 B2 | 12/2012 | Endo et al. |
| 8,507,057 B2 | 8/2013 | Kim et al. |
| 8,512,833 B2 | 8/2013 | Oh et al. |
| 8,518,551 B2 | 8/2013 | Tojo |
| 8,524,343 B2 | 9/2013 | Thompson et al. |
| 8,557,951 B2 | 10/2013 | Lee et al. |
| 8,568,841 B2 | 10/2013 | Kim et al. |
| 8,580,898 B2 | 11/2013 | Lee et al. |
| 8,632,865 B2 | 1/2014 | Kim et al. |
| 8,642,715 B2 | 2/2014 | Hashimoto et al. |
| 8,673,414 B2 | 3/2014 | Haruta et al. |
| 8,685,305 B2 | 4/2014 | Haruta et al. |
| 8,722,161 B2 | 5/2014 | Haruta et al. |
| 8,742,058 B2 | 6/2014 | Horie et al. |
| 8,815,994 B2 | 8/2014 | Kim et al. |
| 8,889,820 B2 | 11/2014 | Asthana et al. |
| 8,901,273 B2 | 12/2014 | Asthana et al. |
| 8,969,506 B2 | 3/2015 | Asthana et al. |
| 8,986,591 B2 | 3/2015 | Shelby et al. |
| 8,993,109 B2 | 3/2015 | Yamamoto et al. |
| 9,017,782 B2 | 4/2015 | Haruta et al. |
| 9,080,027 B2 | 7/2015 | Haruta et al. |
| 9,145,470 B2 | 9/2015 | Alidedeoglu et al. |
| 9,150,006 B2 | 10/2015 | Neill et al. |
| 9,187,637 B2 | 11/2015 | Kim et al. |
| 9,273,182 B2 | 3/2016 | Matsumoto et al. |
| 9,296,867 B2 | 3/2016 | Haruta et al. |
| 9,339,995 B2 | 5/2016 | Zaikov |
| 9,352,508 B2 | 5/2016 | Haruta et al. |
| 9,375,902 B2 | 6/2016 | Manabe et al. |
| 9,410,014 B2 | 8/2016 | Salsman |
| 9,492,987 B2 | 11/2016 | Manabe et al. |
| 9,574,047 B2 | 2/2017 | Kim et al. |
| 9,640,689 B2 | 5/2017 | Hamamoto et al. |
| 9,714,349 B2 | 7/2017 | Togawa et al. |
| 9,777,110 B2 | 10/2017 | Manabe et al. |
| 9,868,815 B2 | 1/2018 | Ohashi et al. |
| 9,920,162 B2 | 3/2018 | Haruta et al. |
| 9,944,012 B2 | 4/2018 | Haruta et al. |
| 10,005,890 B2 | 6/2018 | Cho et al. |
| 10,035,335 B2 | 7/2018 | Haruta et al. |
| 10,173,818 B2 | 1/2019 | Haruta et al. |
| 10,189,962 B2 | 1/2019 | Inoue et al. |
| 10,214,610 B2 | 2/2019 | Park et al. |
| 10,287,433 B2 | 5/2019 | Haruta et al. |
| 10,329,393 B2 | 6/2019 | Shih et al. |
| 10,336,521 B2 | 7/2019 | Hashida et al. |
| 10,392,485 B2 | 8/2019 | Ishimaru et al. |
| 10,407,555 B2 | 9/2019 | Inagaki et al. |
| 10,421,231 B2 | 9/2019 | Inoue et al. |
| 10,717,811 B2 | 7/2020 | Lim et al. |
| 10,800,897 B2 | 10/2020 | Shin et al. |
| 10,800,898 B2 | 10/2020 | Shin et al. |
| 10,994,880 B2 | 5/2021 | Kim et al. |
| 11,008,434 B2 | 5/2021 | Shin et al. |
| 11,008,435 B2 | 5/2021 | Shin et al. |
| 11,155,691 B2 | 10/2021 | Kim et al. |
| 2001/0036545 A1 | 11/2001 | Nishi et al. |
| 2003/0068453 A1 | 4/2003 | Kong |
| 2003/0165671 A1 | 9/2003 | Hashimoto et al. |

(56) References Cited

U.S. PATENT DOCUMENTS

| | | |
|---|---|---|
| 2003/0170427 A1 | 9/2003 | Ito et al. |
| 2005/0010018 A1* | 1/2005 | Kim ................... C08J 5/18 528/307 |
| 2005/0113556 A1* | 5/2005 | Strand ................. C08L 67/02 528/307 |
| 2005/0119359 A1 | 6/2005 | Shelby et al. |
| 2005/0163986 A1* | 7/2005 | Marlow ................. C08J 5/18 528/480 |
| 2006/0121219 A1 | 6/2006 | Shelby et al. |
| 2006/0249715 A1 | 11/2006 | Salyer et al. |
| 2007/0004813 A1 | 1/2007 | Shelby et al. |
| 2008/0241769 A1 | 10/2008 | Quintens et al. |
| 2009/0074998 A1 | 3/2009 | Hiruma et al. |
| 2009/0227735 A1 | 9/2009 | Shih et al. |
| 2009/0291284 A1 | 11/2009 | Frauenhofer et al. |
| 2010/0249293 A1 | 9/2010 | Treece et al. |
| 2011/0081510 A1 | 4/2011 | Shih et al. |
| 2011/0091705 A1 | 4/2011 | Shih et al. |
| 2011/0224369 A1 | 9/2011 | Kim et al. |
| 2013/0095371 A1 | 4/2013 | Zaikov |
| 2013/0217830 A1* | 8/2013 | Crawford ............. C08L 67/02 525/173 |
| 2016/0122485 A1 | 5/2016 | Lim et al. |
| 2016/0236448 A9 | 8/2016 | Fresnel |
| 2018/0162616 A1 | 6/2018 | Inoue et al. |
| 2018/0319539 A1 | 11/2018 | Haruta et al. |
| 2019/0169386 A1 | 6/2019 | Inoue et al. |
| 2019/0210262 A1 | 7/2019 | Haruta |
| 2019/0309161 A1 | 10/2019 | Oh |
| 2019/0375552 A1 | 12/2019 | Haruta et al. |
| 2020/0062954 A1 | 2/2020 | Lim et al. |
| 2020/0074888 A1 | 3/2020 | Maruyama et al. |
| 2020/0081300 A1 | 3/2020 | Heo et al. |
| 2020/0207934 A1 | 7/2020 | Inoue et al. |
| 2021/0054140 A1 | 2/2021 | Shin et al. |
| 2021/0122897 A1 | 4/2021 | Kim et al. |

FOREIGN PATENT DOCUMENTS

| | | |
|---|---|---|
| EP | 0 934 813 A2 | 8/1999 |
| EP | 1 186 633 B1 | 6/2005 |
| EP | 1 448 679 B1 | 4/2007 |
| EP | 2 008 811 A1 | 12/2008 |
| EP | 1 819 756 B1 | 10/2014 |
| EP | 2 998 341 B1 | 12/2016 |
| EP | 2 832 793 B1 | 7/2018 |
| EP | 3 170 866 B1 | 2/2019 |
| EP | 3 572 451 A1 | 11/2019 |
| EP | 3 584 052 A1 | 12/2019 |
| EP | 3 617 247 A1 | 3/2020 |
| JP | 61-037827 A | 2/1986 |
| JP | 2781598 B2 | 11/1990 |
| JP | H02 289627 A | 11/1990 |
| JP | H0368634 A | 3/1991 |
| JP | H0753737 A | 2/1995 |
| JP | H0733063 A | 4/1995 |
| JP | H07138388 A | 5/1995 |
| JP | 2006028 C | 1/1996 |
| JP | 2596287 B2 | 4/1997 |
| JP | 2629370 B2 | 7/1997 |
| JP | 2781598 | 7/1998 |
| JP | 2793713 B2 | 9/1998 |
| JP | H07188400 A | 7/2001 |
| JP | 2002 301788 A | 10/2002 |
| JP | 3351473 B2 | 11/2002 |
| JP | 2004 051888 A | 2/2004 |
| JP | 2004058383 A | 2/2004 |
| JP | 2004181863 | 7/2004 |
| JP | 2005206730 A | 8/2005 |
| JP | H09254257 A | 3/2007 |
| JP | 4439778 | 3/2010 |
| JP | 4488126 B2 | 6/2010 |
| JP | 2015136797 | 7/2015 |
| KR | 19950008582 | 4/1995 |
| KR | 100874131 B1 | 12/2008 |
| KR | 101526623 B1 | 6/2015 |
| KR | 101561286 B1 | 10/2015 |
| WO | WO 2001 021373 A1 | 3/2001 |
| WO | WO 2004 069896 A1 | 8/2004 |
| WO | WO 2006 071826 A1 | 7/2006 |
| WO | WO 2009 151290 A2 | 12/2009 |
| WO | WO 2010 064811 A2 | 6/2010 |
| WO | WO 2010 110876 A1 | 9/2010 |
| WO | WO 2019 103370 A1 | 5/2019 |
| WO | WO 2019 147457 A2 | 8/2019 |
| WO | WO 2019 147676 A1 | 8/2019 |
| WO | WO 2020 026972 A1 | 2/2020 |
| WO | WO 2020 076747 A1 | 4/2020 |
| WO | WO 2020 076749 A1 | 4/2020 |

OTHER PUBLICATIONS

Notification of Transmittal of the International Search Report and the Written Opinion of the International Searching Authority, or the Declaration date of mailing Dec. 19, 2019 received in International Application No. PCT/US2019/055092.

Notification of Transmittal of the International Search Report and the Written Opinion of the International Searching Authority, or the Declaration date of mailing Jul. 19, 2021 received in International Application No. PCT/US2021/025865.

https://www.thebalancesmb.com/recycling-polyethylene-terephthalate-pet-2877869; Leblanc, Rick; "Recycling Polyethylene Terephthalate"; Apr. 8, 2020; 10 pages.

The Association of Plastic Recyclers; "Critical Guidance Protocol for Clear PET Articles with Labels and Closures"; Document No. PET-CG-02; Apr. 11, 2019; 8 pages.

Association of Postconsumer Plastic Recyclers; "Champions for Change Critical Issues Guidance for Innovations Sleeve Label Substrate for PET Bottles Critical Guidance Document"; Jun. 18, 2012; 20 pages.

Throne, James; "1.5 Methods of Forming"; Thermoforming—Definitions, History, Methods and Equipment; Hanser Publishers; 1996; pp. 16-29.

U.S. Appl. No. 15/867,848, filed Jan. 11, 2018; now U.S. Pat. No. 10,543,656; Peters, et al.

U.S. Appl. No. 16/710,127, filed Dec. 11, 2019; now U.S. Pat. No. 10,882,272; Peters, et al.

U.S. Appl. No. 17/247,157, filed Dec. 2, 2020; now U. S. Publication No. 2021-0086468; Peters, et al.

Co-pending U.S. Appl. No. 17/250,974, filed Apr. 6, 2021; Peters, et al.

Non-Final Office Communication notification date Sep. 16, 2022 received in U.S. Appl. No. 17/247,157.

Third-Party Submission under 37 CFR 1.290 received in U.S. Appl. No. 17/250,975 dated Feb. 22, 2022.

Co-pending U.S. Appl. No. 17/907,734, filed Sep. 29, 2022; Peters, et al.; now U. S. Publication No. 2023-0128818.

Third-Party Submission under 37 CFR 1.290 received in U.S. Appl. No. 17/907,734 dated Oct. 26, 2023.

\* cited by examiner

CRYSTALLIZABLE SHRINKABLE FILMS AND THERMOFORMABLE SHEETS MADE FROM RESINS BLENDS

CROSS-REFERENCE TO RELATED APPLICATION(S)

This application is a national stage filing under 35 USC § 371 of International Application Number PCT/US2019/055092, filed on, Oct. 8, 2019 which claims the benefit of the filing date to U.S. Provisional Application No. 62/742,726, filed on Oct. 8, 2018 and U.S. Provisional Application No. 62/782,626, filed on Dec. 20, 2018, the entire disclosures of which are incorporated by reference herein.

FIELD OF THE INVENTION

The present disclosure relates to crystallizable shrinkable films and thermoformable sheets comprising blends of polyester compositions which comprise residues of terephthalic acid, neopentyl glycol (NPG), 1,4-cyclohexanedimethanol (CHDM), ethylene glycol (EG), and diethylene glycol (DEG), in certain compositional ranges having certain advantages and improved properties.

BACKGROUND OF THE INVENTION

There is a commercial need for shrink films that have at least one of the following desirable shrink film properties: (1) low onset shrinkage temperature, (2) a shrinkage percentage which increases gradually and in a controlled manner with increasing temperature over the temperature range where shrinkage occurs, (3) a shrink force low enough to prevent crushing of the underlying container, (4) a high ultimate shrinkage (shrinkage at the highest temperature), e.g. 50% or greater shrinkage in the main shrinkage direction at 95° C., (5) low shrinkage in the direction orthogonal to the high shrinkage direction, (6) improved film toughness so as to prevent unnecessary fracturing, breaking, tearing, splitting, bubbling, or wrinkling of the film during manufacture and prior to and after shrinkage, and (7) recyclability.

There is a commercial need for thermoformable sheet with good properties and recyclability.

BRIEF SUMMARY OF THE INVENTION

It has been found that blends made with polyesters that contain certain combinations of glycol monomers in a shrink film resin composition can produce a film with good shrink film performance and also be crystallizable such that it does not impact the recycling of the accompanying PET flake during recycling. These crystallizable shrink film resin blends can be processed with the PET bottle and end up as a component in the recyclable PET flake leaving the recycling process. It has also been found that the choice and quantity of specific combinations of polyesters in the blends that contain certain glycol monomers are important to produce films with good shrink film properties and to produce a film that is crystallizable. The optimized polyester resin blend compositions of this disclosure are amorphous but crystallizable. As such, they exhibit good properties in film application including as shrink films, but they have high strain induced crystalline melting points, so they provide superior performance in recycling processes. The shrink film labels of the present disclosure do not have to be removed during the recycle process, and they do not impact the process.

Thermoshrinkable films must meet a variety of fitness for use criteria to perform in this application. The films must be tough, must shrink in a controlled manner, and must provide enough shrink force to hold itself on the bottle without crushing the contents. In addition, when these labels are applied to polyester containers, polyester shrink film labels must not interfere with the recycling process of the bottle. It would be advantageous if the label could be recyclable so the entire bottle, including the label, can be recycled and converted into new products without creating additional handling requirements or creating new environmental issues. Thermoshrinkable films have been made from a variety of raw materials to meet a range of material demands. This disclosure describes unique and unexpected effects measured with blends of polyesters that are made with certain monomer combinations for shrink film resin compositions.

Polyester shrink film compositions have been used commercially as shrink film labels for food, beverage, personal care, household goods, etc. Often, these shrink films are used in combination with clear polyethylene terephthalate (PET) bottles or containers. The total package (bottle plus label) is then placed in the recycling process. In a typical recycling center, the PET and the shrink film material can end up together at the end of the process due to similarities in composition and density. Drying of the PET flake is required to remove residual water that remains with the PET through the recycling process. Typically, PET is dried at temperatures above 200° C. At those temperatures, typical polyester shrink film resins will soften and become sticky, often creating clumps with PET flakes. These clumps must be removed before further processing. These clumps reduce the yield of PET flake from the process and create an additional handling step.

Also, it has been found that certain combinations of glycol monomers in a film or sheet resin composition can produce film or sheet with good performance properties and is also crystallizable such that it does not impact the recycling of the PET flake. These crystallizable film or sheet resins can be processed with recycled PET and end up as a component in the recyclable PET flake leaving the recycling process. It has also been found that the choice and quantity of specific combinations of glycol monomers are important to produce films or sheet with good performance properties and to produce a film or sheet that is crystallizable; in other words, the polyester compositions are amorphous but are "crystallizable" in the sense that they have high strain induced crystalline melting points. As such, they exhibit good properties in film or sheet applications including as molded, thermoformed, or shaped parts and/or articles, but they also possess high strain induced crystalline melting points, so they can be recycled with PET, because when the recycle PET flakes are subjected to high temperature drying conditions, the crystallizable polyesters of the invention do not form clumps, which deter the normal mechanical operation of flaking, drying, and feeding of the flake into an extruder for further processing into (recycled)polyester pellets. Similarly, the sheet of the present disclosure does not have to be removed during the recycle process because it does not adversely impact the recycle process. (See, for example, https://www.thebalancesmb.com/recycling-polyethylene-terephthalate-pet-2877869.)

One embodiment of the present disclosure is a crystallizable film comprising a blend of polyester compositions comprising: (1) at least one crystallizable polyester which comprises: residues of terephthalic acid, neopentyl glycol (NPG), 1,4-cyclohexanedimethanol (CHDM), ethylene glycol (EG), and diethylene glycol (DEG), in certain compositional ranges and (2) at least one amorphous polyester which comprises: residues of terephthalic acid, neopentyl glycol (NPG), 1,4-cyclohexanedimethanol (CHDM), ethylene glycol (EG), and diethylene glycol (DEG), in certain compositional ranges.

One embodiment of the present disclosure relates to crystallizable polyester blend compositions. In one embodiment, the crystallizable polyester blend composition comprises: (a) from 5 to 95 weight % of the crystallizable polyester compositions and (b) from 5 to 95 weight % of at least one amorphous polyester compositions.

One embodiment of the present disclosure is crystallizable composition comprising a blend of polyester compositions comprising:

(1) 5-80% of at least one crystallizable polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   a diol component chosen from either (b) or (b'), wherein
   (b) is a diol component comprising:
   about 75 mole % or greater of ethylene glycol residues and about 25 mole % or less of other glycols comprising one or more of:
      (i) about 0 to less than about 25 mole % of neopentyl glycol residues;
      (ii) about 0 to less than about 25 mole % of 1,4-cyclohexanedimethanol residues;
      (iii) about 0 to less than about 10 mole % of total diethylene glycol residues in the final polyester composition;
   wherein the total mole % of the dicarboxylic acid component is 100 mole %, and wherein the total mole % of the diol component is 100 mole %; and wherein
   (b') is a diol component comprising:
   about 75 mole % or greater of ethylene glycol residues and about 25 mole % or less of other glycols comprising one or more of:
      (i) about 0.1 to less than about 24 mole % of neopentyl glycol residues;
      (ii) about 0.1 to less than about 24 mole % of 1,4-cyclohexanedimethanol residues;
      (iii) about 1 to less than about 10 mole % of total diethylene glycol residues in the final polyester composition;
   wherein the total mole % of the dicarboxylic acid component is 100 mole %,
   and wherein the total mole % of the diol component is 100 mole %.
   and
(2) 20-95% of at least one amorphous polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
   about 60 mole % or greater of ethylene glycol residues and about 40 mole % or less of other glycols comprising one or more of:
      (i) about 0 to less than about 40 mole % of neopentyl glycol residues;
      (ii) about 0 to less than about 40 mole % of 1,4-cyclohexanedimethanol residues;
      (iii) about 0 to less than about 15 mole % of total diethylene glycol residues in the final polyester composition;
   wherein the total mole % of the dicarboxylic acid component is 100 mole %, and wherein the total mole % of the diol component is 100 mole %; and wherein (1) and (2) are different.

One embodiment of the present disclosure is a crystallizable composition comprising a blend of polyester compositions comprising:

(1) 5-80% of at least one crystallizable polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
   about 80 mole % or greater of ethylene glycol residues and about 20 mole % or less of other glycols comprising one or more of:
      (i) about 0 to less than about 20 mole % of neopentyl glycol residues;
      (ii) about 0 to less than about 20 mole % of 1,4-cyclohexanedimethanol residues;
      (iii) about 0 to less than about 10 mole % of total diethylene glycol residues in the final polyester composition;
   wherein the total mole % of the dicarboxylic acid component is 100 mole %,
   and wherein the total mole % of the diol component is 100 mole %; and
(2) 20-95% of at least one amorphous polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
   about 70 mole % or greater of ethylene glycol residues and about 30 mole % or less of other glycols comprising one or more of:
      (i) about 0 to less than about 30 mole % of neopentyl glycol residues;
      (ii) about 0 to less than about 30 mole % of 1,4-cyclohexanedimethanol residues;
      (iii) about 0 to less than about 15 mole % of total diethylene glycol residues in the final polyester composition;
   wherein the total mole % of the dicarboxylic acid component is 100 mole %,
   and wherein the total mole % of the diol component is 100 mole %; and
   wherein (1) and (2) are different.

One embodiment of the present disclosure is a crystallizable composition comprising a blend of polyester compositions comprising:
(1) 5-80% of at least one crystallizable polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
about 85 mole % or greater of ethylene glycol residues and
about 15 mole % or less of other glycols comprising one or more of:
(i) about 0 to less than about 15 mole % of neopentyl glycol residues;
(ii) about 0 to less than about 15 mole % of 1,4-cyclohexanedimethanol residues;
(iii) about 0 to less than about 5 mole % of total diethylene glycol residues in the final polyester composition;
wherein the total mole % of the dicarboxylic acid component is 100 mole %, and wherein the total mole % of the diol component is 100 mole %; and
(2) 20-95% of at least one amorphous polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
about 60 mole % or greater of ethylene glycol residues and
about 40 mole % or less of other glycols comprising one or more of:
(i) neopentyl glycol residues;
(ii) 1,4-cyclohexanedimethanol residues; and
(iii) diethylene glycol residues in the final polyester composition, whether or not formed in situ;
wherein the total mole % of the dicarboxylic acid component is 100 mole %, and wherein the total mole % of the diol component is 100 mole %; and wherein (1) and (2) are different.

One embodiment of the present disclosure is a crystallizable composition comprising a blend of polyester compositions comprising:
(1) 5-80% of at least one crystallizable polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 0 to about 30 mole % of neopentyl glycol residues;
(ii) about 0 to about less than 30 mole % of 1,4-cyclohexanedimethanol residues;
(iii) residues of diethylene glycol; and
wherein the remainder of the glycol component comprises:
(iv) residues of ethylene glycol, and
(v) optionally, 0.1 to 20 mole %, of the residues of at least one modifying glycol;
wherein the total mole % of the dicarboxylic acid component is 100 mole %, and wherein the total mole % of the glycol component is 100 mole %; and
(2) 20-95% of at least one amorphous polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 0 to about 40 mole % of neopentyl glycol residues;
(ii) about 0 to about less than 40 mole % of 1,4-cyclohexanedimethanol residues;
(iii) residues of diethylene glycol, whether or not formed in situ; and
wherein the remainder of the glycol component comprises:
(iv) residues of ethylene glycol, and
(v) 0 to 20 mole %, or 0 to 10 mole %, or 0 to 5 mole % of the residues of at least one modifying glycol;
wherein the total mole % of the dicarboxylic acid component is 100 mole %, and wherein the total mole % of the glycol component is 100 mole %; wherein (1) and (2) are different.

In other embodiments of the disclosure, the blend compositions have a crystalline melting point in the range of about 200 to about 255° C.

In other embodiments of the disclosure, the above blends have a crystalline melting point in a range of about 220° to about 230° C. or in the range of about 245° to about 255° C. In other embodiments, component (1) has a crystalline melting point of about 220° to about 230° C.

One embodiment of the present disclosure is a crystallizable film of the preceding embodiments, wherein the film is stretched in at least one direction and the stretched film has a strain induced crystalline melting point of 200° C. or greater.

One embodiment of the present disclosure is a thermoformed or thermoformable film or sheet comprising a blend of polyester compositions comprising: (1) at least one crystallizable polyester which comprises: residues of terephthalic acid, neopentyl glycol (NPG), 1,4-cyclohexanedimethanol (CHDM), ethylene glycol (EG), and diethylene glycol (DEG), in certain compositional ranges and (2) at least one amorphous polyester which comprises: residues of terephthalic acid, neopentyl glycol (NPG), 1,4-cyclohexanedimethanol (CHDM), ethylene glycol (EG), 2,2,4,4-tetramethyl-1,3-cyclobutanediol (TMCD), and diethylene glycol (DEG), in certain compositional ranges.

One embodiment of the present disclosure relates to thermoformed or thermoformable film or sheet comprising crystallizable polyester blend compositions. In one embodiment, the thermoformed or thermoformable film or sheet comprises crystallizable polyester blend composition comprising: (a) from 5 to 95 weight % of the crystallizable polyester compositions and (b) from 5 to 95 weight % of at least one amorphous polyester compositions.

One embodiment of the present disclosure is a thermoformed sheet having a thickness of from about 0.25 mm to about 6.4 mm, comprising a crystallizable composition comprising a blend of polyester compositions comprising:
(1) 5-80% of at least one crystallizable polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  a diol component chosen from either (b) or (b'), wherein
  (b) is a diol component comprising:
about 75 mole % or greater of ethylene glycol residues and about 25 mole % or less of other glycols comprising one or more of:
    (i) about 0 to less than about 25 mole % of neopentyl glycol residues;
    (ii) about 0 to less than about 25 mole % of 1,4-cyclohexanedimethanol residues;
    (iii) about 0 to less than about 10 mole % of total diethylene glycol residues in the final polyester composition;
wherein the total mole % of the dicarboxylic acid component is 100 mole %, and wherein the total mole % of the diol component is 100 mole %; and wherein
  (b') is a diol component comprising:
about 75 mole % or greater of ethylene glycol residues and about 25 mole % or less of other glycols comprising one or more of:
    i) about 0.1 to less than about 24 mole % of neopentyl glycol residues;
    (ii) about 0.1 to less than about 24 mole % of 1,4-cyclohexanedimethanol residues;
    (iii) about 1 to less than about 10 mole % of total diethylene glycol residues in the final polyester composition;
wherein the total mole % of the dicarboxylic acid component is 100 mole %,
and wherein the total mole % of the diol component is 100 mole %.
  and
(2) 20-95% of at least one amorphous polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 60 mole % or greater of ethylene glycol residues and about 40 mole % or less of other glycols comprising one or more of:
    (i) about 0 to less than about 40 mole % of neopentyl glycol residues;
    (ii) about 0 to less than about 40 mole % of 1,4-cyclohexanedimethanol residues;
    (iii) about 0 to less than about 15 mole % of total diethylene glycol residues in the final polyester composition;
wherein the total mole % of the dicarboxylic acid component is 100 mole %, and wherein the total mole % of the diol component is 100 mole %; and wherein (1) and (2) are different.

One embodiment of the present disclosure is a thermoformed sheet having a thickness of from about 0.25 mm to about 6.4 mm, comprising a crystallizable composition comprising a blend of polyester compositions comprising:
(1) 5-80% of at least one crystallizable polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 80 mole % or greater of ethylene glycol residues and about 20 mole % or less of other glycols comprising one or more of:
    (i) about 0 to less than about 20 mole % of neopentyl glycol residues;
    (ii) about 0 to less than about 20 mole % of 1,4-cyclohexanedimethanol residues;
    (iii) about 0 to less than about 10 mole % of total diethylene glycol residues in the final polyester composition, whether or not formed in situ;
wherein the total mole % of the dicarboxylic acid component is 100 mole %,
and wherein the total mole % of the diol component is 100 mole %; and
(2) 20-95% of at least one amorphous polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 70 mole % or greater of ethylene glycol residues and about 30 mole % or less of other glycols comprising one or more of:
    (i) about 0 to less than about 30 mole % of neopentyl glycol residues;
    (ii) about 0 to less than about 30 mole % of 1,4-cyclohexanedimethanol residues;
    (iii) about 0 to less than about 15 mole % of total diethylene glycol residues in the final polyester composition;
wherein the total mole % of the dicarboxylic acid component is 100 mole %, and wherein the total mole % of the diol component is 100 mole %; and
wherein (1) and (2) are different.

One embodiment of the present invention is a thermoformed sheet having a thickness of from about 0.25 mm to about 6.4 mm, comprising a crystallizable composition comprising a blend of polyester compositions comprising:
(1) 5-80% of at least one crystallizable polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 80 mole % or greater of ethylene glycol residues and about 15 mole % or less of other glycols comprising one or more of:
    (i) about 0 to less than about 15 mole % of neopentyl glycol residues;

(ii) about 0 to less than about 15 mole % of 1,4-cyclohexanedimethanol residues;

(iii) about 0 to less than about 5 mole % of total diethylene glycol residues in the final polyester composition, wherein the total mole % of the dicarboxylic acid component is 100 mole %, and wherein the total mole % of the diol component is 100 mole %; and (2) 20-95% of at least one amorphous polyester which comprises:

(a) a dicarboxylic acid component comprising:
  (i) about 70 to about 100 mole % of terephthalic acid residues;
  (ii) about 0 to about 30 mole % of aromatic and/or aliphatic dicarboxylic acid residues having up to 20 carbon atoms; and (b) a diol component comprising:
about 60 mole % or greater of ethylene glycol residues and about 40 mole % or less of other glycols comprising one or more of:
  (i) neopentyl glycol residues;
  (ii) 1,4-cyclohexanedimethanol residues;
  (iii) total diethylene glycol residues in the final polyester composition;

wherein the total mole % of the dicarboxylic acid component is 100 mole %, and wherein the total mole % of the diol component is 100 mole %; and wherein (1) and (2) are different.

One embodiment of the present disclosure is a thermoformed sheet having a thickness of from about 0.25 mm to about 6.4 mm, comprising a crystallizable composition comprising a blend of polyester compositions comprising:

(1) 5-80% of at least one crystallizable polyester which comprises:

(a) a dicarboxylic acid component comprising:
  (i) about 70 to about 100 mole % of terephthalic acid residues;
  (ii) about 0 to about 30 mole % of aromatic and/or aliphatic dicarboxylic acid residues having up to 20 carbon atoms; and (b) a diol component comprising:
  (i) about 0 to about 30 mole % of neopentyl glycol residues;
  (ii) about 0 to about less than 30 mole % of 1,4-cyclohexanedimethanol residues;
  (iii) residues of diethylene glycol; and wherein the remainder of the glycol component comprises:
  (iv) residues of ethylene glycol, and
  (v) optionally, 0.1 to 10 mole %, of the residues of at least one modifying glycol;

wherein the total mole % of the dicarboxylic acid component is 100 mole %, and wherein the total mole % of the glycol component is 100 mole %; and (2) 20-95% of at least one amorphous polyester which comprises:

(a) a dicarboxylic acid component comprising:
  (i) about 70 to about 100 mole % of terephthalic acid residues;
  (ii) about 0 to about 30 mole % of aromatic and/or aliphatic dicarboxylic acid residues having up to 20 carbon atoms; and (b) a diol component comprising:
  (i) about 0 to about 40 mole % of neopentyl glycol residues;
  (ii) about 0 to about less than 40 mole % of 1,4-cyclohexanedimethanol residues;
  (iii) residues of diethylene glycol; and wherein the remainder of the glycol component comprises:
  (iv) residues of ethylene glycol, and
  (v) optionally, 0.1 to 10 mole %, of the residues of at least one modifying glycol;

wherein the total mole % of the dicarboxylic acid component is 100 mole %, and wherein the total mole % of the glycol component is 100 mole %; and wherein (1) and (2) are different.

One embodiment of the present disclosure is an extruded or calendared film comprising the blends of crystallizable compositions of any of the preceding embodiments.

One embodiment of the present disclosure is a molded, thermoformed, or shaped article comprising or prepared from the sheet of any of the preceding embodiments.

One embodiment of the present disclosure is a medical device packaging, medical packaging, healthcare supplies packaging, commercial foodservice products, trays, containers, food pans, tumblers, storage boxes, bottles, food processors, blender and mixer bowls, utensils, water bottles, crisper trays, washing machine parts, refrigerator parts, vacuum cleaner parts, ophthalmic lenses and frames or toys comprising or prepared from the thermoformed or thermoformable sheet of any of the preceding embodiments.

One embodiment of the present disclosure is an article of manufacture comprising or prepared from the thermoformed or thermoformable sheet of any of the preceding claims.

One embodiment of the present disclosure is a method of making the thermoformed film or sheet of any of the preceding embodiments comprising: A. heating the polyester film or sheet; B. applying air pressure, vacuum and/or physical pressure to the heat softened film or sheet; C. conforming the sheet by vacuum or pressure to a mold shape; D. Cooling the thermoformed part and E. removing the thermoformed part or article from the mold.

The Association for Plastic Recyclers (APR) has established a test for measuring whether a material is compatible with the current recycling process (PET-CG-02). In that test, labels (minimum 3% by weight) and bottles are ground to a ¼" to ½" flake size. The bottle flake is then blended 50:50 with unlabeled control bottle flake. The sample is then elutriated on a setting that allows no more than 1.2% of the PET to be carried over with label. The flake is washed with 0.3% Triton X-100 and 1.0% caustic for 15 minutes at 88° C. The flake is then washed with water after removing all floating material and then strained to remove excess water. The flake is elutriated again just as before. Then 2 lbs of washed flake is placed in a Teflon-lined baking dish for each washed sampled and the flake is added to a layer thickness of 1.5 inches. The pan containing the flake is place in a circulating oven at 208° C. for 1½ hours. The flake is cooled and then passed through a sieve with 0.0625 inch openings. As the material is passed through the sieve, no material should clump and therefore become too large to pass through the sieve. This testing is followed by extrusion/pelletization and molding steps to ensure quality of the flake.

The crystallizable blend compositions of the present disclosure thus present an advantageous component of a PET recycle stream insofar as such compositions can accompany PET in recycle streams without additional separation steps. Accordingly, in one embodiment of the present disclosure there is provided a polyester recycle stream, comprising recycled poly(ethylene terephthalate) flake, having admixed therewith at least about 0.1 weight percent of the crystallizable blends of the present disclosure. In another embodiment, said stream passes the "Critical Guidance Protocol for Clear PET Articles with Labels and Closures", dated Apr. 11, 2019, Document No. PET-CG-02.

DETAILED DESCRIPTION

Figure 1:
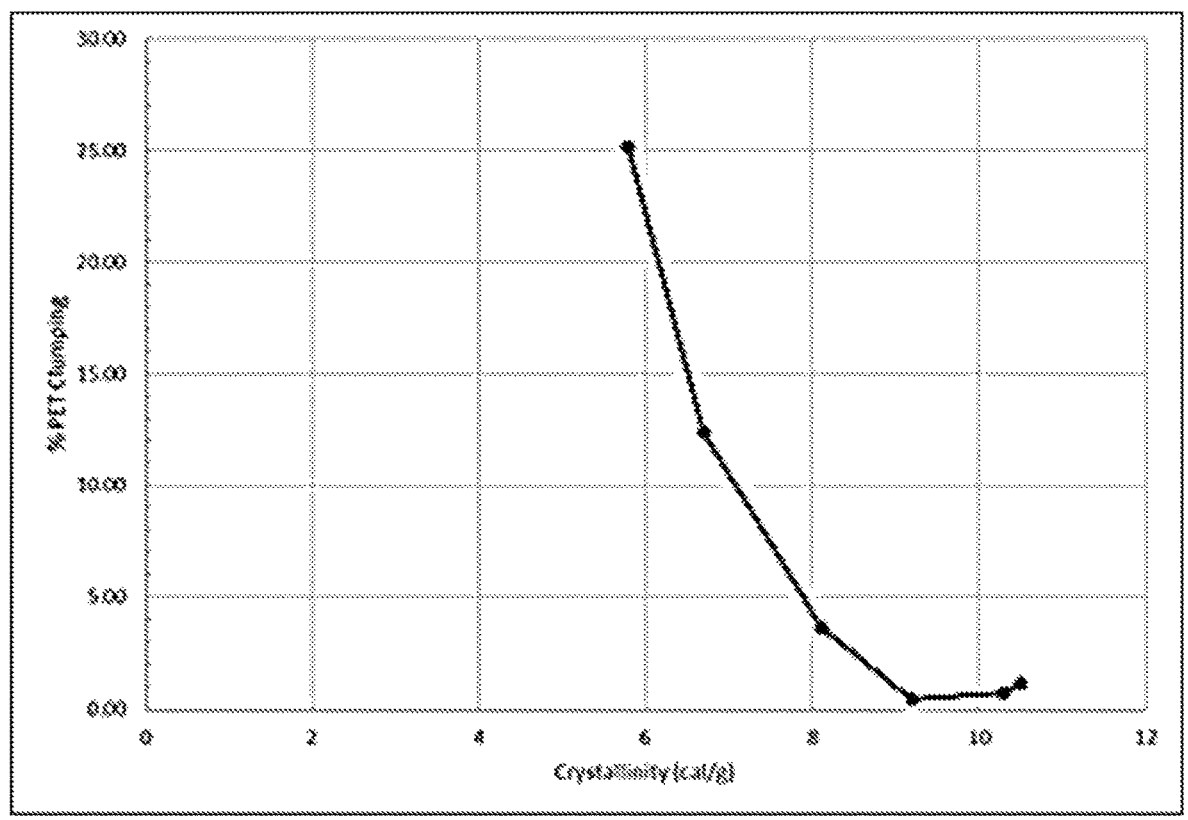
FIG. 1 is a plot of crystallinity versus % PET clumping for blends made with resin #1 and resin #2.
Figure 2:
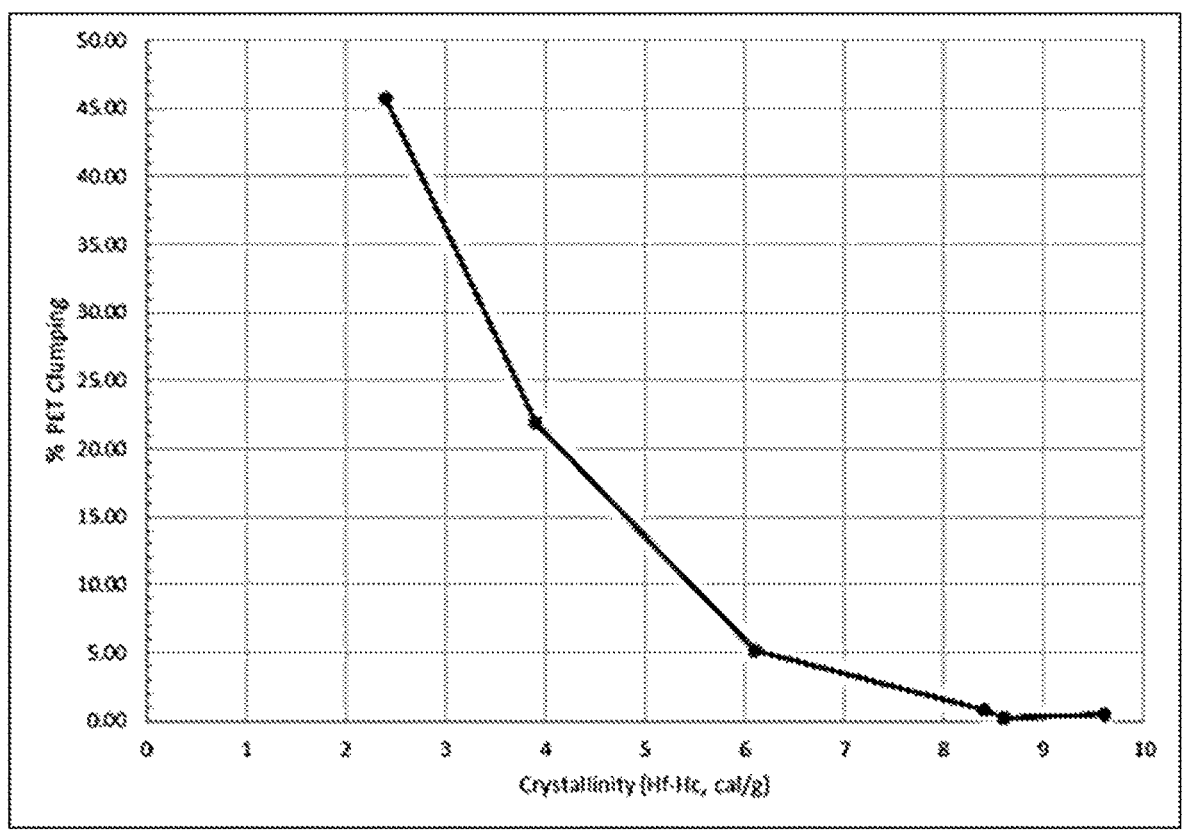
FIG. 2 is a plot of crystallinity versus % PET clumping for blends made with resin #2 and resin #3.

The present disclosure may be understood more readily by reference to the following detailed description of certain embodiments of the disclosure and the working examples. In accordance with the purpose(s) of this disclosure, certain embodiments of the disclosure are described in the Summary of the Invention and are further described herein below. Also, other embodiments of the disclosure are described herein.

Heat-shrinkable plastic films are used as coverings, to hold objects together, and as an outer wrapping for bottles, cans and other kinds of containers. For example, such films are used for covering the cap, neck, shoulder or bulge of bottles or the entire bottle; for the purpose of labeling, protection, parceling, or increasing the value of the product; and for other reasons. In addition, such films may be used as a covering to package such objects as boxes, bottles, boards, rods, or notebooks together in groups, and such films may also be attached closely as a wrapping. The uses mentioned above take advantage of the shrinkability and the internal shrink stress of the film.

Historically, Poly(vinyl chloride) (PVC) films dominated the shrink film market. However, polyester films have become a significant alternative because polyester films do not possess the environmental problems associated with PVC films. Polyester shrink films ideally would have properties very similar to PVC films so that the polyester can serve as a "drop-in" film replacement on that can be processed in existing shrink tunnel equipment. PVC film properties that are desired for duplication include the following: (1) a relatively low shrinkage onset temperature, (2) a total shrinkage which increases gradually and in a controlled manner with increasing temperature, (3) a low shrink force to prevent crushing of the underlying container, (4) a high total shrinkage (for example, 50% or greater) and (5) an inherent film toughness so as to prevent unnecessary tearing and splitting of the film prior to and after shrinkage.

Thermoshrinkable films must meet a variety of fitness for use criteria in order to perform in this application. The films must be tough, must shrink in a controlled manner, and must provide enough shrink force to hold itself on the bottle without crushing the contents. In addition, when these labels are applied to polyester containers, they must not interfere with the recycling process for the PET bottle. In fact, it would be advantageous, if the label was also recyclable so the entire bottle can be recycled and converted into new products without creating additional handling requirements or create new environmental issues. Thermoshrinkable films have been made from a variety of raw materials to meet a range of material demands. This disclosure describes unique and unexpected effects measured with blends of polyesters that contain certain monomer combinations that improves the recyclability of the polyester shrink film label.

Shrink film compositions are used commercially as shrink film labels for food, beverage, personal care, household goods, etc. Often, these shrink films are used in combination with clear polyethylene terephthalate (PET) bottles or containers. The total package (bottle plus label) is then placed in the recycling process. In a typical recycling center, the PET and the shrink film material can end up together at the end of the process due to similarities in composition and density. Drying of the PET flake is required to remove residual water that remains with the PET through the recycling process. Typically, PET is dried at temperatures above 200° C. At those temperatures, typical polyester shrink film resins will soften and become sticky, often creating clumps with PET flakes. These clumps must be removed before further processing. These clumps reduce the yield of PET flake from the process and create an additional handling step.

It has been found that polyesters that contain certain combinations of glycol monomers in shrink film polyester resin blend compositions can produce films with good shrink film performance and also be crystallizable such that it does not impact the recycling of the PET flake during recycling. These crystallizable shrink film resin blends can be processed with the PET bottle and end up as a component in the recyclable PET flake leaving the recycling process. It has also been found that the choice and quantity of specific combinations of glycol monomers in each composition (the amorphous composition and the crystallizable composition) of the crystallizable polyester blend composition are important to produce films with good shrink film properties and to produce a film that is crystallizable.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid, for example, p-hydroxybenzoic acid, and the difunctional hydroxyl compound may have an aromatic nucleus bearing 2 hydroxyl substituents, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through an ester group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make a polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make a polyester.

The polyesters used in the present disclosure typically can be prepared from dicarboxylic acids and diols which react in substantially equal proportions and are incorporated into the polyester polymer as their corresponding residues. The polyesters of the present disclosure, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 1,4-cyclohexanedimethanol, based on the total diol residues, means the polyester contains 25 mole % 1,4-cyclohexanedimethanol residues out of a total of 100 mole % diol residues. Thus, there are 25 moles of 1,4-cyclohexanedimethanol residues among every 100 moles of diol residues.

In certain embodiments, terephthalic acid or an ester thereof, for example, dimethyl terephthalate or a mixture of terephthalic acid residues and an ester thereof can make up a portion or all of the dicarboxylic acid component used to form the polyesters useful in the present disclosure. In certain embodiments, terephthalic acid residues can make up a portion or all of the dicarboxylic acid component used to form the polyesters useful in this disclosure. For the purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present disclosure. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the present disclosure can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present disclosure include but are not limited to those having up to 20 carbon atoms, and which can be linear, para-oriented, or symmetrical. Examples of modifying aromatic dicarboxylic acids which may be used in this disclosure include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the present disclosure can be further modified with up to 10 mole %, such as up to 5 mole % or up to 1 mole % of one or more aliphatic dicarboxylic acids containing 2-16 carbon atoms, for example, cyclohexanedicarboxylic, malonic, succinic, glutaric, adipic, pimelic, suberic, azelaic and/or dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters and are useful in the present disclosure.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, the diol component of the polyester compositions and the polyester blend compositions useful in the present disclosure can comprise 1,4-cyclohexanedimethanol. In another embodiment, the diol component of the polyester compositions and the polyester blend compositions useful in the present disclosure comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

The diol component of the crystallizable polyester compositions and the crystallizable polyester blend compositions useful in the present disclosure can include, but is not limited to, compositions wherein the sum of the residues of 1,4-cyclohexanedimethanol and residues of neopentyl glycol in the final polyester composition is from 1 to 30 mole %, or from 1 to 25 mole %, 1 to 20 mole %, or from 1 to 15 mole %, or from 1 to 10 mole %, or from 2 to 30 mole %, or from 2 to 25 mole %, or from 2 to 20 mole %, or from 2 to 15 mole %, or from 2 to 10 mole %, or from 3 to 30 mole %, or from 3 to 25 mole %, or from 3 to 20 mole %, or from 3 to 15 mole %, or from 3 to 10 mole %, 4 to 30 mole %, or from 4 to 25 mole %, 4 to 20 mole %, or from 4 to 15 mole %, or from 4 to 10 mole %, 5 to 30 mole %, or from 5 to 25 mole %, 5 to 20 mole %, or from 5 to 15 mole %, or from 5 to 10 mole %, 6 to 30 mole %, or from 6 to 25 mole %, 6 to 20 mole %, or from 6 to 15 mole %, or from 6 to 10 mole %, 7 to 30 mole %, or from 7 to 25 mole %, 7 to 20 mole %, or from 7 to 15 mole %, or from 7 to 10 mole %, 8 to 30 mole %, or from 8 to 25 mole %, 8 to 20 mole %, or from 8 to 15 mole %, or from 8 to 10 mole %, 9 to 30 mole %, or from 9 to 25 mole %, 9 to 20 mole %, or from 9 to 15 mole %, or from 9 to 10 mole %, 10 to 30 mole %, or from 10 to 25 mole %, 10 to 20 mole %, or from 10 to 15 mole %, or from 11 to 30 mole %, 11 to 30 mole %, or from 11 to 25 mole %, 11 to 20 mole %, or from 11 to 15 mole %, or from 12 to 30 mole %, 12 to 25 mole %, or from 12 to 20 mole %, 12 to 15 mole %, or from 13 to 30 mole %, or from 13 to 25 mole %, 13 to 20 mole %, or from 13 to 15 mole %, 14 to 30 mole %, or from 14 to 25 mole %, or from 14 to 20 mole %, 14 to 15 mole %, or from 15 to 30 mole %, 15 to 25 mole %, or from 15 to 20 mole %, or from 16 to 20 mole %, 18 to 20 mole %, or from 10 to 18 mole %, 16 to 18 mole %, or from 12 to 16 mole %, or from 16 to 20 mole %, or from 14 to 18 mole %, or from 11 to 30 mole %, or from 13 to 30 mole %, or from 14 to 30 mole %, or from 10 to 29 mole %, or from 11 to 29 mole %, or from 12 to 29 mole %, or from 13 to 29 mole %, or from 14 to 29 mole %, or from 15 to 29 mole %, or from 10 to 28 mole %, or from 11 to 28 mole %, or from 12 to 28 mole %, or from 13 to 28 mole %, or from 14 to 28 mole %, or from 15 to 28 mole %. In one embodiment, the sum of residues of 1,4-cyclohexanedimethanol and residues of neopentyl glycol in the final polyester composition can be from 4 to 15 mole %, or from 2 to 21 mole %, or from 2 to less than 20 mole %, or from 4 to 20 mole %, or from 5 to 18 mole %, or from 10 to 21 mole %, or from 12 to 21 mole %, wherein the total mole % of the diol component is 100 mole %.

In one embodiment, the diol component of the crystallizable polyester compositions and crystallizable polyester blend compositions useful in this disclosure can contain 0 to 30 mole % of neopentyl glycol based on the total mole % of the diol component being 100 mole %. In one embodiment, the diol component of the polyester compositions and the polyester blend compositions useful in this disclosure can contain 0 to 25 mole % of neopentyl glycol based on the total mole % of the diol component being 100 mole %. In one embodiment, the diol component of the polyester compositions and polyester blend compositions useful in this disclosure can contain 0 to 17 mole % of neopentyl glycol based on the total mole % of the diol component being 100 mole %. In one embodiment, the diol component of the polyester compositions and polyester blend compositions useful in this disclosure can contain 5 to 20 mole % of neopentyl glycol based on the total mole % of the diol component being 100 mole %. In one embodiment, the diol component of the polyester compositions and polyester blend compositions useful in this disclosure can contain 10 to 20 mole % of neopentyl glycol based on the total mole % of the diol component being 100 mole %. In one embodiment, the diol component of the polyester compositions and polyester blend compositions useful in this disclosure can contain 10 to 15 mole % of neopentyl glycol based on the total mole % of the diol component being 100 mole %. In one embodiment, the diol component of the polyester compositions and polyester blend compositions useful in this disclosure can contain 15 to 25 mole % of neopentyl glycol based on the total mole % of the diol component being 100 mole %.

In one embodiment, the diol component of the crystallizable polyester compositions and crystallizable polyester blend compositions useful in the present disclosure can contain from 0 to 30 mole %, or from 0.01 to 30 mole %, or from 0 to 20 mole %, or from 0.1 to 20 mole %, or from 2 to 20 mole %, or from 0.01 to 15 mole %, or from 0.01 to 14 mole %, or from 0.01 to 13 mole %, or from 0.01 to 12 mole %, or from 0.01 to 11 mole %, or 0.01 to 10 mole %, or from 0.01 to 9 mole %, or from 0.01 to 8 mole %, or from 0.01 to 7 mole %, or from 0.01 to 6 mole %, or from 0.01 to 5 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, of 1,4-cyclohexanedimethanol residues, based on the total mole % of the diol component being 100 mole %.

In one embodiment, the diol component of the crystallizable polyester compositions and the crystallizable polyester blend compositions of the polyester blend compositions useful in the present disclosure can contain 0 to 15 mole % of 1,4-cyclohexanedimethanol based on the total mole % of the diol component being 100 mole %. In one embodiment, the diol component of the polyester compositions useful in this disclosure can contain 0.01 to less than 15 mole % of 1,4-cyclohexanedimethanol based on the total mole % of the diol component being 100 mole %. In one embodiment, the diol component of the polyester compositions useful in this disclosure can contain 0 to 10 mole % of 1,4-cyclohexanedimethanol based on the total mole % of the diol component being 100 mole %. In one embodiment, the diol component of the polyester compositions useful in this disclosure can contain 0.01 to less than 10 mole % of 1,4-cyclohexanedimethanol based on the total mole % of the diol component being 100 mole %. In one embodiment, the diol component of the polyester compositions useful in this disclosure can contain 0.01 to 5 mole % of 1,4-cyclohexanedimethanol based on the total mole % of the diol component being 100 mole %. In one embodiment, the diol component of the polyester compositions useful in this disclosure can contain 0 to less than 5 mole % of 1,4-cyclohexanedimethanol based on the total mole % of the diol component being 100 mole %.

It should be understood that some other diol residues may be formed in situ during processing. The total amount of diethylene glycol residues can be present in the crystallizable polyester blend compositions useful in the present disclosure, whether or not formed in situ during processing or intentionally added, or both, in any amount, for example, from 1 to 15 mole %, or from 2 to 12 mole %, or from 2 to 11 mole %, or 2 to 10 mole %, or from 2 to 9 mole %, or from 3 to 12 mole %, or from 3 to 11 mole %, or 3 to 10 mole %, or from 3 to 9 mole %, or from 4 to 12 mole %, or from 4 to 11 mole %, or 4 to 10 mole %, or from 4 to 9 mole %, or, from 5 to 12 mole %, or from 5 to 11 mole %, or 5 to 10 mole %, or from 5 to 9 mole %, of diethylene glycol residues, based on the total mole % of the diol component being 100 mole %.

In one embodiment, the total amount of diethylene glycol residues can be present in the polyester useful in the present disclosure, whether or not formed in situ during processing or intentionally added or both, can be from 5 mole % or less, or 4 mole % or less, or from 3.5 mole % or less, or from 3.0 mole % or less, or from 2.5 mole % or less, or from 2.0 mole % or less, or from 1.5 mole % or less, or from 1.0 mole % or less, or from 1 to 4 mole %, or from 1 to 3 mole %, or from 1 to 2 mole % of diethylene glycol residues, or from 2 to 8 mole %, or from 2 to 7 mole %, or from 2 to 6 mole %, or from 2 to 5 mole %, or from 3 to 8 mole %, or from 3 to 7 mole %, or from 3 to 6 mole %, or from 3 to 5 mole %, or in some embodiments there is no intentionally added diethylene glycol residues, based on the total mole % of the diol component being 100 mole %. In certain embodiments, the polyester contains no added modifying diols. In certain embodiments, the diethylene glycol residues of crystallizable polyester compositions of the polyester blend compositions can be from 5 mole % or less.

In one embodiment, the diol component of the crystallizable polyester blend compositions useful in the present disclosure can contain up to 20 mole %, or up to 19 mole %, or up to 18 mole %, or up to 17 mole %, or up to 16 mole %, or up to 15 mole %, or up to 14 mole %, or up to 13 mole %, or up to 12 mole %, or up to 11 mole %, or up to 10 mole %, or up to 9 mole %, or up to 8 mole %, or up to 7 mole %, or up to 6 mole %, or up to 5 mole %, or up to 4 mole %, or up to 3 mole %, or up to 2 mole %, or up to 1 mole %, or less of one or more modifying diols (modifying diols are defined as diols which are not ethylene glycol, diethylene glycol, neopentyl glycol, or 1,4-cyclohexanedimethanol). In certain embodiments, the polyesters useful in this disclosure can contain 10 mole % or less of one or more modifying diols. In certain embodiments, the polyesters useful in this disclosure can contain 5 mole % or less of one or more modifying diols. In certain embodiments, the polyesters useful in this disclosure can contain 3 mole % or less of one or more modifying diols. In another embodiment, the polyesters useful in this disclosure can contain 0 mole % modifying diols. It is contemplated, however, that some other diol residuals may form in situ so that residual amounts formed in situ are also an embodiment of this disclosure.

In embodiments, modifying diols for use in the crystallizable polyesters blend compositions, if used, as defined herein contain 2 to 16 carbon atoms. Examples of modifying diols include, but are not limited to, 1,2-propanediol, 1,3-propanediol, isosorbide, 1,4-butanediol, 1,5-pentanediol, 1,6-hexanediol, p-xylene glycol, polytetramethylene glycol, 2,2,4,4-tetramethyl-1,3-cyclobutanediol (TMCD) and mixtures thereof. In one embodiment, isosorbide is a modifying diol. In another embodiment, the modifying diols include, but are not limited to, at least one of 1,3-propanediol and 1,4-butanediol. In one embodiment, 1,3-propanediol and/or 1,4-butanediol can be excluded. If 1,4- or 1,3-butanediol are used, greater than 4 mole % or greater than 5 mole % can be provided in one embodiment. In one embodiment, at least one modifying diol is 1,4-butanediol which present in the amount of 5 to 25 mole %.

For all embodiments, the remainder of the diol component can comprise ethylene glycol residues in any amount based on the total mole % of the diol component being 100 mole %. In one embodiment, the crystallizable polyester blend compositions useful in the present disclosure can contain 50 mole % or greater, or 55 mole % or greater, or 60 mole % or greater, or 65 mole % or greater, or 70 mole % or greater, or 75 mole % or greater, or 80 mole % or greater, or 85 mole % or greater, or 90 mole % or greater, or 95 mole % or greater, or from 50 to 80 mole %, or from 55 to 80 mole %, or from 60 to 80 mole %, or from 50 to 75 mole %, or from 55 to 75 mole %, or from 60 to 75 mole %, or from 65 to 75 mole % of ethylene glycol residues, based on the total mole % of the diol component being 100 mole %.

In one embodiment, a shrink film is provided comprising a crystallizable polyester blend composition (i.e., components (1) and (2)) further comprising: 1,4-cyclohexanedimethanol residues are present in the amount of 0.01 to about 10 mole %, diethylene glycol residues are present in the amount of 2 to 9 mole %, neopentyl glycol residues in the amount of 5 to 30 mole %, and ethylene glycol residues are present in the amount of 60 mole % or greater, based on the total mole % of the diol component being 100 mole %.

In one embodiment, a shrink film is provided comprising a crystallizable polyester blend composition comprising: 1,4-cyclohexanedimethanol residues are present in the amount of 0.01 to about 5 mole %, diethylene glycol residues are present in the amount of 1 to 9 mole %, neopentyl glycol residues in the amount of 5 to 25 mole %, and ethylene glycol residues are present in the amount of 60 mole % or greater, based on the total mole % of the diol component being 100 mole %.

In one embodiment, a shrink film is provided comprising a crystallizable polyester blend composition comprising: 1,4-cyclohexanedimethanol residues are present in the amount of about 10 to about 20 mole %, diethylene glycol residues are present in the amount of 1 to 10 mole %, neopentyl glycol residues in the amount of up to about 1 mole %, and ethylene glycol residues are present in the amount of 60 mole % or greater, based on the total mole % of the diol component being 100 mole %.

In one embodiment, a shrink film is provided comprising a crystallizable polyester blend composition comprising: 1,4-cyclohexanedimethanol residues are present in the amount of 2 to 7 mole %, diethylene glycol residues are present in the amount of less than 10 mole %, neopentyl glycol residues in the amount of 5 to 20 mole %, and ethylene glycol residues are present in the amount of greater than 60 mole %, based on the total mole % of the diol component being 100 mole %.

In one embodiment, a shrink film is provided comprising a crystallizable polyester blend composition comprising: 1,4-cyclohexanedimethanol residues are present in the amount of less than 10 mole %, diethylene glycol residues are present in the amount of from 1 to 10 mole %, neopentyl glycol residues in the amount of greater than 5 mole %, and ethylene glycol residues are present in the amount of 60 mole % or greater, based on the total mole % of the diol component being 100 mole %.

In one embodiment, a shrink film is provided wherein the sum of one or more diol monomer components capable of forming an amorphous polyester composition in the polyester blend composition is from 20 to 45 mole %, or from 22 to 45 mole %, or from 20 to 40 mole %, or from 24 to 40 mole %, or from 30 to 45 mole %, or 25 to 45 mole %, or from 25 to 40 mole % or from 25 to 35 mole %, wherein the total mole % of the diol component content is 100 mole %.

In one embodiment, a shrink film is provided wherein the sum of the residues of 1,4-cyclohexanedimethanol and residues of neopentyl glycol in the amorphous polyester composition of the polyester blend is from 12 to 35 mole %, or from 15 to 40 mole %, or from 15 to 35 mole %, or from 20 to 40 mole %, or from 25 to 40 mole %, or from 20 to 45 mole %, or from 25 to 35 mole %, wherein the total mole % of the diol component is 100 mole %.

In one embodiment of the present disclosure is provided a crystallizable film comprising a blend of polyester compositions comprising: (1) at least one crystallizable polyester which comprises: residues of terephthalic acid, from 0 to about 20 mole %, or from 0 to about 17 mole %, or from about 1 to about 20 mole % or from about 1 to about 17 mole % or from about 5 to about 20 mole % of neopentyl glycol (NPG) residues, and from 0 to about 20 mole %, or from 0 to about 17 mole %, or from about 1 to about 20 mole % or from about 1 to about 17 mole % or from about 5 to about 20 mole % of 1,4-cyclohexanedimethanol (CHDM), and from about less than 5 mole % of diethylene glycol (DEG) residues, with the remainder as ethylene glycol (EG) residues, and (2) at least one amorphous polyester which comprises: residues of terephthalic acid, and from 0 to about 40 mole %, or from 0 to about 30 mole %, or from about 1 to about 40 mole % or from about 10 to about 20 mole %, or from about 10 to about 40 mole %, or from about 5 to about 30 mole % of neopentyl glycol (NPG), and from 0 to about 40 mole %, or from 0 to about 35 mole %, or from about 1 to about 30 mole % or from about 10 to about 40 mole % or from about 20 to about 40 mole % of 1,4-cyclohexanedimethanol (CHDM), and from 1 to about 15 mole %, or from 2 to about 10 mole %, or from about 5 to about 15 mole % or from about 5 to about 10 mole % of diethylene glycol (DEG), with the remainder as ethylene glycol (EG) residues.

In some embodiments, the polyester compositions according to the present disclosure can comprise from 0 to 10 mole %, for example, from 0.01 to 5 mole %, from 0.01 to 1 mole %, from 0.05 to 5 mole %, from 0.05 to 1 mole %, or from 0.1 to 0.7 mole %, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. In some embodiments, the polyester(s) useful in the present disclosure can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole % of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters useful in the present disclosure can comprise at least one chain extender. Suitable chain extenders include, but are not limited to, multifunctional (including, but not limited to, bifunctional) isocyanates, multifunctional epoxides, including, for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion.

The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

It is contemplated that polyester blend compositions useful in the present disclosure can possess at least one of the inherent viscosity ranges described herein and at least one of the monomer ranges for the polyester compositions described herein, unless otherwise stated. It is also contemplated that polyester blend compositions useful in the present disclosure can possess at least one of the Tg ranges described herein and at least one of the monomer ranges for the polyester compositions described herein, unless otherwise stated. It is also contemplated that polyester compositions useful in the present disclosure can possess at least one of the inherent viscosity ranges described herein, at least one of the Tg ranges described herein, and at least one of the monomer ranges for the polyester compositions described herein, unless otherwise stated.

For embodiments of this disclosure, the polyester compositions useful in this disclosure can exhibit at least one of the following inherent viscosities as determined in 60/40 (wt/wt) phenol/tetrachloroethane at a concentration of 0.5 g/dL at 25° C.: 0.50 to 1.2 dL/g; 0.50 to 1.0 dL/g; 0.50 to 0.90 dL/g; 0.50 to 0.80 dL/g; 0.55 to 0.80 dL/g; 0.60 to 0.80 dL/g; 0.65 to 0.80 dL/g; 0.70 to 0.80 dL/g; 0.50 to 0.75 dL/g; 0.55 to 0.75 dL/g; or 0.60 to 0.75 dL/g.

The glass transition temperature (Tg) of the polyesters of the polyester blend compositions is determined using a TA DSC 2920 from Thermal Analyst Instrument at a scan rate of 20° C./min. The value of the glass transition temperature is determined during the second heat.

In certain embodiments, the oriented films or shrink films of this disclosure comprise polyesters/polyester compositions wherein the polyester has a Tg of 60 to 80° C.; 70 to 80° C.; or 65 to 80° C.; or 65 to 75° C. In certain embodiments, these Tg ranges can be met with or without at least one plasticizer being added during polymerization.

In embodiments of the present disclosure, certain oriented films and/or shrinkable films comprising the polyesters and/or polyester compositions useful in this disclosure can have a unique combination of all of the following properties: good stretchability, controlled shrinkage properties, certain toughness, certain inherent viscosities, certain glass transition temperatures (Tg), certain strain induced crystalline melting points, certain flexural modulus, certain densities, certain tensile modulus, certain surface tension, good melt viscosity, good clarity, and good color.

In one embodiment, certain polyester blend compositions useful in this disclosure can be visually clear. The term "visually clear" is defined herein as an appreciable absence of cloudiness, haziness, and/or muddiness, when inspected visually.

The polyester portions (the amorphous compositions and the crystallizable compositions) of the polyester blend compositions useful in this disclosure can be made by processes known from the literature, for example, by processes in homogenous solution, by transesterification processes in the melt, and by two phase interfacial processes. Suitable methods include, but are not limited to, the steps of reacting one or more dicarboxylic acids with one or more diols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the diol in the presence of a catalyst at elevated temperatures increased gradually during the course of the condensation up to a temperature of about 225° C. to 310° C., in an inert atmosphere, and conducting the condensation at low pressure during the latter part of the condensation, as described in further detail in U.S. Pat. No. 2,720,507 incorporated herein by reference herein.

In some embodiments, during the process for making the polyester blend composition useful in the present disclosure, certain agents which colorize the polymer can be added to the melt including toners or dyes. In one embodiment, a bluing toner is added to the melt in order to reduce the b* of the resulting polyester polymer melt phase product. Such bluing agents include blue inorganic and organic toner(s) and/or dyes. In addition, red toner(s) and/or dyes can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm can be used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor, or the toner can be added during a compounding or extrusion step after polymerization.

The present disclosure further relates to polymers compounded with the crystallizable polyester compositions as part of the polyester blend composition. In one embodiment, the compounded compositions comprise: (a) from 5 to 80 weight % of the crystallizable polyester compositions of the disclosure described herein; and (b) from 20 to 95 weight % of at least one polymeric component (i.e., a component which is other than the blends of this disclosure).

Suitable examples of the polymeric components include, but are not limited to, nylon; polyesters different than those described herein; polyamides such as ZYTEL® from DuPont; polystyrene; polystyrene copolymers; styrene acrylonitrile copolymers; acrylonitrile butadiene styrene copolymers; poly(methyl methacrylate); acrylic copolymers; poly(ether-imides) such as ULTEM® (a poly(ether-imide) from SABIC); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from SABIC); polyphenylene sulfides; polyphenylene sulfide/sulfones; poly(ester-carbonates); polycarbonates such as LEXAN® (a polycarbonate from SABIC); polysulfones; polysulfone ethers; and poly(ether-ketones) of aromatic dihydroxy compounds; or mixtures of any of the foregoing polymers. In one embodiment, aliphatic-aromatic polyesters can be excluded from the polyester compositions useful in this disclosure. The following polyesters, which can be blended to make the polyester compositions of this disclosure, can be excluded as the polymeric components used in additional blending if such blending exceeds the compositional ranges of the disclosure: polyethylene terephthalate (PET), glycol modified PET (PETG), glycol modified poly(cyclohexylene dimethylene terephthalate) (PCTG), poly(cyclohexylene dimethylene terephthalate) (PCT), acid modified poly(cyclohexylene dimethylene terephthalate) (PCTA), poly(butylene terephthalate) and/or diethylene glycol modified PET (EASTOBOND™ copolyester).

The blends can be prepared by conventional processing techniques known in the art, such as melt blending or solution blending.

In embodiments, the polyester compositions and the polymer blend compositions can also contain from 0.01 to 25% by weight of the overall composition common additives such as colorants, toner(s), dyes, mold release agents, flame retardants, plasticizers, glass bubbles, nucleating agents, stabilizers, including but not limited to, UV stabilizers, thermal stabilizers, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be added to the compositions useful in this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In one embodiment, the films and the shrink films according to the present disclosure may contain from 0.01 to 10 weight percent of the polyester plasticizer. In one embodiment, the shrink films can contain from 0.1 to 5 weight percent of the polyester plasticizer. Generally, the shrink films can contain from 90 to 99.99 weight percent of the copolyester. In certain embodiments, the shrink films can contain from 95 to 99.9 weight percent of the copolyester.

In one aspect, the present disclosure relates to shrink film(s) and molded article(s) of this disclosure comprising the polyester compositions and/or polymer blends useful in this disclosure. The methods of forming the polyesters and/or blends into film(s) and/or sheet(s) are well known in the art. Examples of film(s) and/or sheet(s) useful the present disclosure include but not are limited to extruded film(s) and/or sheet(s), compression molded film(s), calendered film(s) and/or sheet(s), solution casted film(s) and/or sheet(s). In one aspect, methods of making film and/or sheet useful to produce the shrink films of the present disclosure include but are not limited to extrusion, compression molding, calendering, and solution casting.

In one embodiment, the polyester composition useful in this disclosure are made into film using any method known in the art to produce films from polyesters, for example, solution casting, extrusion, compression molding, or calendering.

In one embodiment, the as-formed film is then oriented in one or more directions (e.g., monoaxially and/or biaxially oriented film). This orientation of the film can be performed by any method known in the art using standard orientation conditions. For example, the oriented films of the disclosure can be made from films having a thickness of about 100 to 400 microns, for example, extruded, cast or calendered films, which can be oriented at a ratio of 5:1 to 3:1 at a temperature of from Tg to Tg+55° C., for example, at a ratio of 5:1 or of 3:1 at a temperature from 70° C. to 125° C., and which can be oriented to a thickness of 20 to 80 microns. In one embodiment, the orientation of the initial as-formed film can be performed on a tenter frame according to these orientation conditions.

The shrink films of the present disclosure can have an onset of shrinkage temperature of from about 55 to about 80° C., or about 55 to about 75° C., or about 55 to about 70° C. Onset of shrinkage temperature is the temperature at which the beginning of shrinking occurs.

In certain embodiments, the polyester compositions useful in the present disclosure can have densities of 1.6 g/cc or less, or 1.5 g/cc or less, or 1.4 g/cc or less, or 1.1 g/cc to 1.5 g/cc, or 1.2 g/cc to 1.4 g/cc, or 1.2 g/cc to 1.35 g/cc.

In one embodiment, the density of the films is reduced by introducing many small voids or holes into the film or shaped article. This process is called "voiding" and may also be referred to as "cavitating" or "microvoiding". Voids are obtained by incorporating about 1 to about 50 weight % of small organic or inorganic particles (including glass microspheres) or "inclusions" (referred in the art as "voiding" or "cavitation" agents) into a matrix polymer and orienting the polymer by stretching in at least one direction. During stretching, small cavities or voids are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001/0036545; 2003/0068453; 2003/0165671; 2003/0170427; Japan Patent Application No.'s 61-037827; 63-193822; 2004-181863; European Patent No. 0 581 970 B1, and European Patent Application No. 0 214 859 A2.

In certain embodiments, the as-formed or extruded films are oriented while they are stretched. The oriented films or shrinkable films of the present disclosure can be made from films having any thickness depending on the desired end-use. The desirable conditions are, in one embodiment, where the oriented films and/or shrinkable films can be printed with ink for applications including labels, photo films which can be adhered to substrates such as paper, and/or other applications that it may be useful in. It may be desirable to coextrude the polyesters useful in the present disclosure with another polymer, such as PET, to make the films useful in making the oriented films and/or shrink films of this disclosure. One advantage of doing the latter is that a tie layer may not be needed in some embodiments.

In one embodiment, the monoaxially and biaxially oriented films of the present disclosure can be made from films having a thickness of about 100 to 400 microns, for example, extruded, cast or calendered films, which can be stretched at a ratio of 6.5:1 to 3:1 at a temperature of from the Tg of the film to the Tg+55 deg C. in one or more directions, and which can be stretched to a thickness of 20 to 80 microns. In one embodiment, the orientation of the initial as extruded film can be performed on a tenter frame according to these orientation conditions. The shrink films of the present disclosure can be made from the oriented films of this disclosure.

In certain embodiments, the shrink films of the present disclosure have gradual shrinkage with little to no wrinkling. In certain embodiments, the shrink films of the present disclosure have no more than 40% shrinkage in the main shrinkage direction per 5° C. temperature increase increment.

In certain embodiments of the present disclosure, the shrink films of this disclosure have shrinkage in the machine direction (i.e. the direction orthogonal to the main shrinkage direction) of from 10% or less, or 5% or less, or 3% or less, or 2% or less, or no shrinkage when immersed in water at 65° C. for 10 seconds. In certain embodiments of the present disclosure, the shrink films of this disclosure have shrinkage in the machine direction of from −5% to 10%, −5% to 5%, or −5% to 3%, or −5% to 2%, or −4% to 5%, or −3% to 5% or −2% to 5%, or −2% to 3%, or −2% to 2%, or 0 to 2%, or no shrinkage, when immersed in water at 65° C. for 10 seconds. Negative machine direction shrinkage percentages here indicate machine direction growth. Positive machine direction shrinkages indicate shrinkage in the machine direction.

In certain embodiments of the present disclosure, the shrink films of this disclosure have shrinkage in the main shrinkage direction of from 50% or greater, or 60% or greater, or 70% or greater, when immersed in water at 95° C. for 10 seconds.

In certain embodiments of the present disclosure, the shrink films of this disclosure have shrinkage in the main shrinkage direction in the amount of 50 to 90% and shrinkage in the machine direction of 10% or less, or from −10% to 10%, when immersed in water at 95° C. for 10 seconds.

In one embodiment, the polyesters useful in the present disclosure are made into films using any method known in the art to produce films from polyesters, for example, solution casting, extrusion, compression molding, or calendering. The as-extruded (or as-formed) film is then oriented in one or more directions (e.g., monoaxially and/or biaxially oriented film). This orientation of the films can be performed by any method known in the art using standard orientation conditions. For example, the monoaxially oriented films of the present disclosure can be made from films having a thickness of about 100 to 400 microns, such as, extruded, cast or calendered films, which can be stretched at a ratio of 6.5:1 to 3:1 at a temperature of from the Tg of the film to the Tg+55 deg C., and which can be stretched to a thickness of 20 to 80 microns. In one embodiment, the orientation of the initial as extruded film can be performed on a tenter frame according to these orientation conditions.

In certain embodiments of the present disclosure, the shrink films of this disclosure can have an onset of shrinkage temperature of from about 55 to about 80° C., or about 55 to about 75° C., or 55 to about 70° C. Onset of shrinkage temperature is the temperature at which onset of shrinking occurs.

In certain embodiments of the present disclosure, the shrink films of this disclosure can have an onset of shrinkage temperature of between 55° C. and 70° C.

In certain embodiments of the present disclosure, the shrink films of this disclosure can have a break strain percentage greater than 200% at a stretching speed of 500 mm/minute in the direction orthogonal to the main shrinkage direction according to ASTM Method D882.

In certain embodiments of the present disclosure, the shrink films of this disclosure can have a break strain percentage of greater than 300% at a stretching speed of 500 mm/minute in the direction orthogonal to the main shrinkage direction according to ASTM Method D882.

In certain embodiments of the present disclosure, the shrink films of this disclosure can have a tensile stress at break (break stress) of from 20 to 400 MPa; or 40 to 260 MPa; or 42 to 260 MPa; 20 to 100 MPa as measured according to ASTM Method D882.

In certain embodiments of the present disclosure, the shrink films of this disclosure can have a shrink force of from 4 to 18 MPa, or from 4 to 15 MPa, as measured by ISO Method 14616 depending on the stretching conditions and the end-use application desired. For example, certain labels made for plastic bottles can have an MPa of from 4 to 8 and certain labels made for glass bottles can have a shrink force of from 10 to 14 Mpa as measured by ISO Method 14616 using a Shrink Force Tester made by LabThink® 80° C.

In one embodiment of the present disclosure, the polyester compositions can be formed by reacting the monomers by known methods for making polyesters in what is typically referred to as reactor grade compositions.

In one embodiment of the present disclosure, the polyester compositions of this disclosure can be formed by blending polyesters, such as polyethylene terephthalate (PET), glycol modified PET (PETG), glycol modified poly(cyclohexylene dimethylene terephthalate) (PCTG), poly(cyclohexylene dimethylene terephthalate) (PCT), acid modified poly(cyclohexylene dimethylene terephthalate) (PCTA), poly(butylene terephthalate) and/or diethylene glycol modified PET (EASTOBOND™ copolyester) to achieve the monomer ranges of these compositions.

In certain embodiments, the polyester compositions and the polymer blend compositions can also contain from 0.01 to 25% by weight of the overall composition common additives such as colorants, toner(s), dyes, mold release agents, flame retardants, plasticizers, glass bubbles, nucleating agents, stabilizers, including but not limited to, UV stabilizers, thermal stabilizers and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials can be added to the polyester compositions useful in this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

Molded articles can also be manufactured from any of the polyester compositions disclosed herein which may or may not consist of or contain shrink films and are included within the scope of the present disclosure.

Generally, the shrink films according to the present disclosure may contain from 0.01 to 10 weight percent of the polyester plasticizer. In one embodiment, the shrink films can contain from 0.1 to 5 weight percent of the polyester plasticizer. Generally, the shrink films can contain from 90 to 99.99 weight percent of the copolyester. In certain embodiments, the shrink films can contain from 95 to 99.9 weight percent of the copolyester.

In one embodiment, when having a pre-oriented thickness of about 100 to 400 microns and then oriented on a tenter frame at from a ratio of 6.5:1 to 3:1 at a temperature from Tg to Tg+55° C. to a thickness of from about 20 to about 80 microns, the shrink films of the present disclosure can have one or more of the following properties: (1) shrinkage in the main shrinkage direction or transverse direction in the amount of greater than 50% (or greater than 60%), and 10% or less (or from −10% to 10%) shrinkage in the machine direction when immersed in water at 95° C. for 10 seconds; (2) an onset of shrinkage temperature of from about 55° C. to about 70° C.; (3) a break strain percentage of greater than 200% at stretching speeds of 500 mm/minute, or 200 to 600%, or 200 to 500%, or 226 to 449%, or 250 to 455% in the transverse direction or in the machine direction or in both directions according to ASTM Method D882; (4) no more than 40% shrinkage per each 5° C. temperature increase increment; and/or (5) a strain induced crystalline melting point greater than 190° C. measured on the $1^{st}$ heat of a DSC scan according to ASTM. Any combination of these properties or all of these properties can be present in the shrink films of this disclosure. The shrink films of the present disclosure can have a combination of two or more of the above described shrink film properties. The shrink films of the present disclosure can have a combination of three or more of the above described shrink film properties. The shrink films of the present disclosure can have a combination of four or more of the above described shrink film properties. In certain embodiments, properties (1)-(2) are present. In certain embodiments, properties (1)-(5) are present. In certain embodiments, properties (1)-(3) are present, etc.

The shrinkage percentages herein are based on initial stretched films having a thickness of about 20 to 80 microns that have been oriented at a ratio of from 6.5:1 to 3:1 at a temperature of Tg to Tg+55° C. on a tenter frame, for example, at a ratio of 5:1 at a temperature from 70° C. to 85° C. In one embodiment, the shrinkage properties of the oriented films used to make the shrink films of this disclosure were not adjusted by annealing the films at a temperature higher than the temperature in which it was oriented. In another embodiment the shrinkage properties can be adjusted by annealing.

The shape of the films useful in making the oriented films or shrink films of the present disclosure is not restricted in any way. For example, it may be a flat film or a film that has been formed into a tube. In order to produce the shrink films useful in the present disclosure, the polyester is first formed into a flat film and then is "uniaxially stretched", meaning the polyester film is oriented in one direction. The edges of the stretched film are then bonded using a seaming solvent or seaming adhesives to form a shrinkable tube. The films could also be "biaxially oriented," meaning the polyester films are oriented in two different directions; for example, the films are stretched in both the machine direction and a direction different from the machine direction. Typically, but not always, the two directions are substantially perpendicular. For example, in one embodiment, the two directions are in the longitudinal or machine direction ("MD") of the film (the direction in which the film is produced on a film-making machine) and the transverse direction ("TD") of the film (the direction perpendicular to the MD of the film). Biaxially oriented films may be sequentially oriented, simultaneously oriented, or oriented by some combination of simultaneous and sequential stretching.

The films may be oriented by any usual method, such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also, the stretching may be done first in one direction and then in the other direction to result in effective biaxial stretching. In one embodiment, stretching of the films is done by preliminarily heating the films 5° C. to 80° C. above their glass transition temperature (Tg). In one embodiment, the films can be preliminarily heated from 10° C. to 30° C. above their Tg. In one embodiment, the stretch rate is from 5 to 20 inches (12.7 to 50.8 cm) per second. Next, the films can be oriented, for example, in either the machine direction, the transverse direction, or both directions from 2 to 6 times the original measurements. The films can be oriented as a single film layer or can be coextruded with another polymeric material or polyester such as PET (polyethylene terephthalate) as a multilayer film and then oriented.

In one embodiment, the present disclosure includes an article of manufacture or a shaped article comprising the shrink films of any of the shrink film embodiments of this disclosure. In another embodiment, the present disclosure includes an article of manufacture or a shaped article comprising the oriented films of any of the oriented film embodiments of this disclosure.

In certain embodiments, the present disclosure includes but is not limited to shrink films applied to containers, plastic bottles, glass bottles, packaging, batteries, hot fill containers, and/or industrial articles or other applications. In one embodiment, the present disclosure includes but is not limited to oriented films applied to containers, packaging, plastic bottles, glass bottles, photo substrates such as paper, batteries, hot fill containers, and/or industrial articles or other applications.

In certain embodiments of the present disclosure, the shrink films of this disclosure can be formed into a label or sleeve. The label or sleeve can then be applied to an article of manufacture, such as, the wall of a container, battery, or onto a sheet or film.

The oriented films or shrink films of the present disclosure can be applied to shaped articles, such as, sheets, films, tubes, bottles and are commonly used in various packaging applications. For example, films and sheets produced from polymers such as polyolefins, polystyrene, poly(vinyl chloride), polyesters, polylactic acid (PLA) and the like are used frequently for the manufacture of shrinkable labels for plastic beverage or food containers. For example, the shrinkable films of the present disclosure can be used in many packaging applications where the shaped article would exhibit properties, such as, good printability, high opacity, higher shrink force, good texture, and good stiffness after application of the shrink film.

The combination of the improved shrink properties as well as the improved toughness should offer new commercial options, including but not limited to, shrink films applied to containers, plastic bottles, glass bottles, packaging, batteries, hot fill containers, and/or industrial articles or other applications.

In one aspect of the present disclosure, the disclosed polyester blend compositions are useful as thermoformed and/or thermoformable film(s) or sheet(s). The present disclosure is also directed to articles of manufacture which incorporate the thermoformed film(s) and/or sheet(s) of this disclosure. In one embodiment, the polyester blend compositions of the present disclosure are useful as films and sheets which are easily formed into shaped or molded articles. In one embodiment, the film(s) and/or sheet(s) of the present disclosure may be processed into molded articles or parts by thermoforming. The polyester compositions of the present disclosure may be used in a variety of molding and extrusion applications.

In addition, in one embodiment, the polyester compositions and the polyester blend compositions useful in the thermoformed sheet(s) of this disclosure may also contain from 0.1 to 25% by weight of the overall composition common additives such as colorants, slip agents, anti-block agents, mold release agents, flame retardants, plasticizers, nucleating agents, stabilizers, including but not limited to, UV stabilizers, thermal stabilizers, fillers, and impact modifiers.

In one embodiment, reinforcing materials may be included in the thermoformed film(s) or sheet(s) comprising the polyester compositions of this disclosure. For examples, suitable the reinforcing materials may include carbon filaments, silicates, mica, clay, talc, titanium dioxide, Wollastonite, glass flakes, glass beads and fibers, and polymeric fibers and combinations thereof.

In one embodiment, the thermoformed films or sheets are multilayered films or sheets. In one embodiment at least one layer of the multilayer film or sheet is a foam or foamed polymer or polyester layer.

One aspect of the present disclosure is a method of making molded or shaped parts and articles using thermoforming. Any thermoforming techniques or processes known to those skilled in the art may be used to produce the molded or shaped articles of this disclosure.

In one embodiment, the thermoforming processes can be done in several ways, for example as taught in "Technology of Thermoforming"; Throne, James; Hanser Publishers; 1996; pp. 16-29, which is incorporated herein by reference. In some embodiments, it is a positive thermoforming process where gas or air pressure is applied to the softened sheet, the sheet is then stretched and drawn out like a bubble and a male mold is brought into the bubble from the inside. Then vacuum is applied to further draw and conform the part to the male mold surface. In this thermoforming process biaxial stretching/orientation is done primarily in one step when there is a gas or air pressure applied to the softened sheet. The molding step is then completed with the vacuum and male mold to freeze the orientation into the sheet after cooling for a good balance of physical and appearance properties. In other embodiments, it is a negative thermoforming process where a vacuum or a physical plug is applied to the heat softened sheet and stretches and draws the sheet to nearly the final part size, and then, positive air pressure from the inside or further external vacuum from the outside draws and conforms the sheet against an outer, female mold, the orientation is frozen into the polymer after cooling and the sheet is formed into the article.

In some embodiments, the produced bubble is sometimes further formed by making use of a plug assist, and this is followed by draping and shaping the sheet over the rising positive mold and then the corners and shelves guides, etc. are pulled into the mold by applying a vacuum. In some embodiments, after removal from the mold, the molded parts or articles can be trimmed, holes punched, and corners cut out as needed.

In other embodiments, thermoforming is a process where a film or sheet of the polyester compositions of the present disclosure are heated to a temperature sufficient to allow the deformation thereof, and the heated film or sheet is then made to conform to the contours of a mold by such means as vacuum assist, air pressure assist and matched mold assist. In another embodiment, the heated film or sheet is placed in a mold and forced to conform to the contours of the mold by, for example, application of air pressure, application of a vacuum, plug assist or application of a matching mold. In some embodiments, thermoforming produces thin wall articles.

In one embodiment, the thermoforming process molds the films or sheets into the desired shapes through the pressing of positive molds into the heated films or sheets. In this embodiment, thermoforming involves having a positive mold of an article supported between a vacuum-equipped surface or table. In this embodiment, heat from an external heat source such as a hot air blower, heat lamp or other radiant heat source is directed at the film or sheet. In this embodiment, the film or sheet is heated to the point of softening. In this embodiment, a vacuum is then applied to and below the table and around the mold, and the heat softened film or sheet is drawn toward the table, thus placing the softened film or sheet in contact with the mold surface. In this embodiment, the vacuum draws the softened film or sheet into tight contact with, and conformance to, the contours of the mold surface. As such, the film or sheet then assumes the shape of the mold. In this embodiment, after the film or sheet cools, it hardens, and the resulting article or part may be removed from the mold.

In one embodiment, the thermoforming process comprises: forming a film or sheet from the polyester blend compositions of the present disclosure; heating the film or sheet until it softens and positioning it over a mold; drawing the preheated film or sheet onto the heated mold surface; cooling the film or sheet; and then removing the molded article or part from the mold cavity, or optionally, heatsetting the formed film or sheet by maintaining the film or sheet in contact against the heated mold for a sufficient time period to partially crystallize the film or sheet.

In one embodiment, the thermoforming process comprising: forming a film or sheet from the polyester blend compositions of the present disclosure; heating a film or sheet to a temperature at or above the Tg of the polyester; applying gas, vacuum and/or physical pressure to the heat softened film or sheet and stretching the film or sheet to nearly the final part size; conforming the sheet by vacuum or pressure to a mold shape; cooling the film or sheet to a temperature below the Tg of the polyester; and then removing the thermoformed article or part from the mold.

The film and sheet used in the thermoforming process can be made by any conventional method known to those skilled in the art. In one embodiment, the sheet or film is formed by extrusion. In one embodiment, the sheet or film is formed by calendering. In one embodiment, during the thermoforming process the film or sheet is heated to a temperature at or above the Tg of the polyester. In one embodiment, this temperature is about 10 to about 60° C. above the Tg of the polyester. In one embodiment, the heating of the film or sheet prior to positioning over the thermoforming mold is necessary in order to achieve a shorter molding time. In one embodiment, the sheet must be heated above its Tg and below the point at which it sags excessively during positioning over the mold cavity. In one embodiment, before the molded film or sheet is removed from the mold it is allowed to cool to a temperature below the Tg of the polyester. In one embodiment, the thermoforming methods may include vacuum assist, air assist, mechanical plug assist or matched mold. In some embodiments, the mold is heated to a temperature at or above the Tg of the film or sheet. Selection of optimum mold temperature is dependent upon type of thermoforming equipment, configuration and wall thickness of article being molded and other factors.

In some embodiments, the heated film or sheet is stretched by creating and pulling a vacuum.

In one embodiment, heatsetting is the process of thermally inducing partial crystallization of a polyester film or sheet without appreciable orientation being present. In one embodiment, heatsetting is achieved by maintaining contact of the film or sheet with the heated mold surface for a sufficient time to achieve a level of crystallinity which gives adequate physical properties to the finished part. In one embodiment, the levels of crystallinity should be about 10 to about 30 percent.

In one embodiment, the heatset part can be removed from the mold cavity by known means for removal. For example, in one embodiment, blowback is used and it involves breaking the vacuum established between the mold and the formed film or sheet by the introduction of compressed air. In some embodiments, the molded article or part is subsequently trimmed and the scrap ground and recycled.

In some embodiments, the addition of nucleating agents provide faster crystallization during thermoforming and thus provide for faster molding. In one embodiment, nucleating agents such as fine particle size inorganic or organic materials may be used. For example, in one embodiment, suitable nucleating agents include talc, titanium dioxide, calcium carbonate, and immiscible or cross-linked polymers. In one embodiment, the nucleating agents are used in amounts varying from about 0.01% to about 20%, based on the weight of the article. In one embodiment, other conventional additives such as pigments, dyes, plasticizers, anti-cracking agent and stabilizers may be used as needed for thermoforming. In some embodiments, the anti-cracking agent improves impact strength, and the nucleating agent provides faster crystallization. In some embodiments, crystallization is necessary to achieve high temperature stability.

In one embodiment, a foamed polyester film or sheet is made by foaming a polyester composition of the present disclosure with chemical and/or physical blow agents, extruding the foamed polyester into sheet or film, and thermoforming the foamed polyester film or sheet. Additives for providing enhanced properties to the foamed polyester film may be added to the polyester prior to foaming. Some examples of additives include slip agents, antiblocking agents, plasticizers, optical brightener and ultra violet inhibitor. In one embodiment, the foamed polyester films can be extrusion or lamination coated on one side or on both sides using conventional techniques in order to enhance its properties. In one embodiment, the coating materials may be applied to the printed surface, rather than the foam film itself, that provides for product labelling.

The blend compositions of this disclosure are useful as molded or shaped plastic parts or as solid plastic objects. The blend compositions of this disclosure are useful as thermoformed parts or articles. The blend compositions are suitable for use in any applications where clear, hard plastics are required. Examples of such parts include disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment, the blend compositions of the present disclosure are useful as plastics, films, fibers, and sheets. In one embodiment the compositions are useful as plastics to make bottles, bottle caps, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, and utensils. In another embodiment, the blend compositions of the present disclosure are suitable for use as films, sheeting, fibers, molded articles, shaped articles, molded parts, shaped parts, medical devices, dental trays, dental appliances, containers, food containers, shipping containers, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, multilayer film, insulated parts, insulated articles, insulated containers, thermoformed letters, siding, toys, toy parts, trays, food trays, dental trays, thermally conductive plastics, ophthalmic lenses and frames, tools, tool handles, and utensils, healthcare supplies, commercial foodservice products, boxes, film for graphic arts applications, plastic film for plastic glass laminates, point of purchase displays, skylights, smoke vents, laminated cards, fenestration, glazing, partitions, ceiling tiles, lighting, machine guards, graphic arts, lenticular, extrusion laminated sheets or films, decorative laminates, office furniture, face shields, medical packaging, sign holders on point of display shelving, and shelf price holds.

The present thermoformed or thermoformable blend compositions are useful in forming films, molded articles, molded parts, shaped articles, shaped parts and sheeting. The methods of making the thermoformed or thermoformable blend compositions into films, molded articles, molded parts, shaped articles, shaped parts and sheeting can be according to any methods known in the art. Examples of molded articles include without limitation: medical device packaging, medical packaging, healthcare supply packaging, commercial foodservice products such as trays, containers, food pans, tumblers, storage boxes, bottles, food processors, blender and mixer bowls, utensils, water bottles, crisper trays, washing machine parts, refrigerator parts, vacuum cleaner parts, ophthalmic lenses and frames, and toys.

This disclosure further relates to articles of manufacture comprising the film(s) and/or sheet(s) containing polyester compositions described herein. In embodiments, the films and/or sheets of the present disclosure can be of any thickness as required for the intended application.

This disclosure further relates to the film(s) and/or sheet(s) described herein. The methods of forming the polyester blend compositions into film(s) and/or sheet(s) includes any methods known in the art. Examples of film(s) and/or sheet(s) of the disclosure including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, wet block processing, dry block processing and solution casting.

This disclosure further relates to the molded or shaped articles described herein. The methods of forming the polyester compositions into molded or shaped articles includes any known methods in the art. Examples of molded or shaped articles of this disclosure including but not limited to thermoformed or thermoformable articles, injection molded articles, extrusion molded articles, injection blow molded articles, injection stretch blow molded articles and extrusion blow molded articles. Methods of making molded articles include but are not limited to thermoforming, injection molding, extrusion, injection blow molding, injection stretch blow molding, and extrusion blow molding. The processes of this disclosure can include any thermoforming processes known in the art. The processes of this disclosure can include any blow molding processes known in the art including, but not limited to, extrusion blow molding, extrusion stretch blow molding, injection blow molding, and injection stretch blow molding.

This disclosure includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This disclosure includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This disclosure includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

The following examples further illustrate how the polyesters of the present disclosure can be made and evaluated, and they are intended to be purely exemplary and are not intended to limit the scope thereof. Unless indicated otherwise, parts are parts by weight, temperature is in degrees C. (Celsius) or is at room temperature, and pressure is at or near atmospheric.

EXAMPLES

Copolyester resin samples were made using procedures described elsewhere. In all cases, resin samples are dried prior to extrusion.

Laboratory film samples were made by extruding the resin samples into 10 mil (250 micron) films using a 2.5 inch Davis and Standard, single screw extruder. These 10 mil films were cut and stretched on a Bruckner Karo 4 tenter frame to approximately a 5:1 stretch ratio and to a final thickness of 50 microns at a temperature 5-15 degrees above the glass transition temperature (Tg) of the extruded film.

Tenter frame film samples were made by extruding and stretching resins samples on a commercial tenter frame (located at Marshall and Williams, a division of Parkinson Technologies) where the film is extruded using a 3 layer, A-B-C die where the B-layer is extruded from a 2.5 inch single screw extruder and the A and C layers are extruded from separate, 1.25 inch single screw satellite extruders. The film is cast at a thickness of roughly 10 mil (250 microns) and then stretched with a 5:1 stretch ratio and to a thickness of 50 microns. In general, the cast thickness is 250 microns and the final film thickness is 50 microns. The line speed was 45 fpm.

The glycol content of the extruded film compositions was determined via NMR. All NMR spectra were recorded on a JEOL Eclipse Plus 600 MHz nuclear magnetic resonance spectrometer using either chloroform-trifluoroacetic acid (70-30 volume/volume) for polymers with deuterated chloroform added for lock. The acid component of the blended polymers used in the examples herein was 100 mole % terephthalic acid. The total mole percentages of the glycol component equaled 100 mole % and the total mole percentages of the acid component equaled 100 mole %.

The inherent viscosity of the polyesters herein was determined in 60/40 (wt/wt) phenol/tetrachloroethane at a concentration of 0.5 g/dL at 25° C., and is reported in dL/g.

Shrinkage is measured herein by placing a 50 mm by 50 mm square film sample in water at a temperature in 5 degree increments between and including 65° C. to 95° C. The film is immersed in the water for 10 seconds without restricting shrinkage in any direction and the shrinkage (or growth) of the film sample is measured. The percent shrinkage is calculated by the following equation:

$$\% \text{ shrinkage} = [(50 \text{ mm} - \text{length after shrinkage})/50 \text{ mm}] \times 100\%.$$

Shrinkage was measured in the direction orthogonal to the main shrinkage direction (machine direction, MD) and was also measured in the main shrinkage direction (transverse direction, TD).

Shrink force is measured for the examples herein with a LabThink FST-02 Thermal Shrinkage Tester in MPa at the same temperature used to stretch the film.

Tensile film properties were measured for the examples herein using ASTM Method D882. Multiple film stretching speeds (300 mm/min and 500 mm/min) were used to evaluate the films.

The glass transition temperature and the strain induced crystalline melting points (Tg and Tm respectively) of the polyesters were determined using a TA DSC 2920 from Thermal Analyst Instruments at a scan rate of 20° C./min. Tm was measured on the first heat of stretched samples and Tg was measured during the $2^{nd}$ heating step. Additionally, samples could be crystallized in a forced air oven at 165° C. for 30 minutes and then analyzed with DSC. For all samples, a crystalline melting point is typically NOT present during the second heat of the DSC scan with a heating rate of 20 deg C./min.

The compatibility of a material in the recycling process has been defined in procedures published by the Association for Plastic Recyclers (APR). In the case of PETG resins, clumping of PET is the major issue that has been addressed with this invention. A laboratory process was developed to mimic this industry standard. Parameters of the laboratory clump test are as follows:

582 g PET flake is combined 18 g shrink flaked film (3% film with PET flake) in its shrunk state (film was previously shrunk by immersing in water at 85° C. for 10 seconds)

PET flake+film was placed in an aluminum pan to achieve a depth of 1.5 inches.

The pan with the flake was placed in a forced air oven at 208° C. for 1.5 hour.

The flake was then poured carefully through a 0.5" sieve and the amount of flake that remained in the pan or that could not pass through the sieve was weighed and the degree of clumping (%) was calculated as a percent of the starting weight.

The Association for Plastic Recyclers (APR) has established a test for measuring whether a material is compatible with the current recycling process (Critical Guidance Protocol for Clear PET Articles with Labels and Closures PET-CG-02, revision or creation date Apr. 11, 2019). This method references a method for measuring PET clumping (PET Flake Clumping Evaluation; PET-S-08; revision date Nov. 16, 2018). The details of this test are as follows:

Labels (minimum 3% by weight, preshrunk for 10 seconds at 85° C.) and bottles are ground to a ¼" to ½" flake size to create labelled bottle flake.

The labelled bottle flake is blended 50:50 with unlabeled control bottle flake.

The sample was then elutriated on a setting that allows no more than 1.2% of the PET to be carried over with label.

The flake is washed with 0.3% Triton X-100 and 1.0% caustic for 15 minutes at 88° C.

The flake is then washed with water after removing all floating material and then strained to remove excess water.

The flake is elutriated again just as before.

2 lbs of washed flake (containing the label) is placed in a Teflon-lined baking dish for each washed sampled and the flake is added to a layer thickness of 1.5 inches.

The pan containing the flake is placed in a circulating oven at 208° C. for 1½ hours.

The flake is cooled and then passed through a sieve with 0.0625 inch openings. As the material is passed through the sieve, no material should clump and therefore become too large to pass through the sieve.

This testing was followed by extrusion/pelletization and molding steps to ensure quality of the flake Modulated Differential Scanning Calorimetry (MDSC) is a technique which measures the difference in heat flow between a sample and an inert reference as a function of time and temperature. In addition, the same heat flux cell design is used as is used in traditional DSC. However, in MDSC a different heating profile (temperature regime) is applied to the sample and reference. Specifically, a sinusoidal modulation (oscillation) is overlaid on the conventional linear heating or cooling ramp to yield a profile in which the average sample temperature continuously changes with time but not in a linear fashion. The net effect of imposing this more complex heating profile on the sample is the same as if two experiments were run simultaneously on the material—one experiment at the traditional linear (average) heating rate and one at a sinusoidal (instantaneous) heating rate. The actual rates for these two simultaneous experiments are dependent on three operator-selectable variables:

Underlying heating rate (3° C./minute)
Period of modulation (60 seconds)
Temperature amplitude of modulation (±1° C.)

Reversing heat flow was used to analyze the glass transition temperature and the area of the melt peak. The heat of fusion (Hf) upon heating was measured as the integrated reversing Heat Flow signal. The heat of crystallization (Hc) upon heating was integrated from the Total Heat Flow signal. The sample's relative crystallinity (C) was measured by subtracting the heat of fusion (Hf) from the heat of crystallization (Hc) upon heating.

Examples 1-12

Laboratory film samples were made with resin blends and evaluated using the laboratory clump test. Details of resin compositions and the resulting film properties derived from those compositions are described in the following examples.

Polymer blends are commonly used to modify the properties of a resin. In these studies, it was found that blending a crystalline resin with an amorphous resin capable of forming a shrinkable film provided a new resin that could be used as a shrinkable film which has an unexpectedly high strain induced crystalline melting point, making it useful for improving the compatibility of the shrinkable film in the recycling process. Table 1 describes the composition of 3 resins that were used to make these laboratory blends. Shrinkable films made exclusively with resin #1 or resin #3 have acceptable shrinkable film properties, but are not designed to minimize clumping of PET in the recycling process. Resin #2 is an example of a crystallizable copolyester resin that can be used to improve the recyclability of resins 1 and 3. Blends made with resins 1 and 2 or resin 2 and 3 using an extruder created clear, compatible films.

TABLE 1

| Resin # | 1 | 2 | 3 |
|---|---|---|---|
| PTA content (mole %) | 100 | 100 | 100 |
| EG content (mole %) | 71 | 88 | 65 |
| NPG (mole %) | 27 | 0 | 0 |
| CHDM (mole %) | 0 | 5 | 23 |
| DEG content (mole %) | 3 | 7 | 12 |
| Total Amorphous Monomer Content (mole %) | 30 | 12 | 35 |

Using a lab scale process, blends 1, 2, and 3 were made by combining resin #1 and resin #2 and resin #2 and #3 in the combinations shown in Table 2. These blends along with their unblended starting materials were converted into shrinkable films using a lab scale process and the properties of those films were measured and are summarized in Table 3. The films made exclusively with resin #1 or resin #3 are not compatible with the PET recycling process and create >1% clumps of PET. The properties of shrinkable film made with these blends are shown in Tables 4 and 5.

TABLE 2

| Blend components (%) | 1 | 2 | 3 |
|---|---|---|---|
| Blend #1 | 40 | 60 | |
| Blend #2 | 50 | 50 | |
| Blend #3 | 60 | 40 | |
| Blend #4 | 80 | 20 | |
| Blend #5 | 90 | 10 | |
| Blend #6 | 95 | 5 | |
| Blend #7 | | 60 | 40 |
| Blend #8 | | 50 | 50 |
| Blend #9 | | 40 | 60 |
| Blend #10 | | 80 | 20 |
| Blend #11 | | 90 | 10 |
| Blend #12 | | 95 | 5 |

TABLE 3

| Measured Shrink Film properties | Resin #1 | Resin #2 | Resin #3 |
|---|---|---|---|
| EG content (mole %) | 72 | 88 | 64 |
| CHDM (mole %) | 0 | 5 | 23 |
| DEG content (mole %) | 2 | 7 | 12 |
| NPG (mole %) | 26 | 0 | 0 |
| Total Amorphous Monomer Content | 28 | 12 | 35 |
| Ultimate shrinkage (% at 95° C.) | 79 | 36 | 79 |
| MD Shrinkage @ 70° C. (%) | −2 | 1 | −3 |
| Shrink Force (Mpa) | 10.0 | 6 | 6.3 |
| Tg (° C.) | 77 | 74 | 70 |
| Strain induced crystalline melting point (° C.) | 180 | 227 | 155 |
| Elongation @ break (%, at 300 mm/min) | 582 | 566 | 563 |
| Elongation @ break (%, at 500 mm/min) | 252 | 598 | 42 |
| PET clumping (%) | 10.3 | 0.45 | 25 |

TABLE 4

| Measured Shrink Film properties | Blend #1 | Blend #2 | Blend #3 | Blend #4 | Blend #5 | Blend #6 |
|---|---|---|---|---|---|---|
| EG content (mole %) | 82 | 81 | 79 | 76 | 74 | 73 |
| CHDM (mole %) | 3 | 2 | 2 | 1 | 1 | 0 |
| DEG content (mole %) | 5 | 4 | 4 | 3 | 2 | 2 |
| NPG (mole %) | 10 | 13 | 15 | 20 | 23 | 25 |
| Total Amorphous Monomer Content | 18 | 19 | 21 | 24 | 26 | 27 |
| Ultimate shrinkage (% at 95° C.) | 62 | 65 | 65 | 77 | 78 | 79 |
| MD Shrinkage @ 70° C. (%) | 2 | 1.5 | 1 | 1 | 0 | −1 |
| Shrink Force (MPa) | 8.3 | 8.8 | 9.9 | 10.1 | 11.3 | 11.2 |
| Tg (° C.) | 75.8 | 75.8 | 75.9 | 76.6 | 77.0 | 77.3 |
| Strain Induced Crystalline Melting Point (° C.) | 225 | 223 | 222 | 219 | 193 | 184 |
| Elongation @ Break (%, at 300 mm/min) | 649 | 584 | 577 | 555 | 576 | 567 |
| Elongation @ Break (%, at 500 mm/min) | 670 | 453 | 590 | 345 | 324 | 275 |
| PET clumping (%, 208° C.) | 0.8 | 0.4 | 1.1 | 3.6 | 12.4 | 25.2 |
| Heat of fusion (Hf, cal/g) | 12.3 | 11.3 | 11.9 | 9.7 | 8.4 | 7.5 |
| Heat of Crystallization (Hc, cal/g) | 2.1 | 2 | 1.3 | 1.6 | 1.7 | 1.7 |
| Relative Crystallinity (Hf − Hc, cal/g) | 10.2 | 9.2 | 10.5 | 8.1 | 6.7 | 5.8 |

TABLE 5

| Measured Shrink Film properties | Resin #7 | Resin #8 | Blend #9 | Blend #10 | Blend #11 | Blend #12 |
|---|---|---|---|---|---|---|
| EG content (mole %) | 80 | 77 | 74 | 70 | 68 | 66 |
| CHDM (mole %) | 11 | 14 | 16 | 19 | 21 | 22 |
| DEG content (mole %) | 9 | 10 | 10 | 11 | 12 | 12 |
| NPG (mole %) | 0 | 0 | 0 | 0 | 0 | 0 |
| Total Amorphous Monomer Content | 20 | 23 | 26 | 30 | 32 | 34 |
| Ultimate shrinkage (% at 95° C.) | 56 | 66 | 70 | 77 | 79 | 79 |
| MD Shrinkage @ 70° C. (%) | 9 | 5 | 4 | 2 | 1 | −2 |
| Shrink Force (MPa) | 8.3 | 8.2 | 7.7 | 7.7 | 7.2 | 7.4 |
| Tg (° C.) | 73 | 73 | 72 | 71 | 71 | 70 |
| Strain induced crystalline melting point (° C.) | 225 | 224 | 223 | 225 | 218 | 160 |
| Elongation @ break (%, at 300 mm/min) | 618 | 656 | 578 | 605 | 608 | 588 |
| Elongation @ break (%, at 500 mm/min) | 657 | 447 | 178 | 32 | 17 | 16 |
| PET clumping (%) | 0.5 | 0.3 | 0.8 | 5 | 22 | 46 |
| Heat of fusion (Hf, cal/g) | 11.2 | 10.4 | 10.1 | 7.8 | 5.9 | 4.4 |
| Heat of Crystallization (Hc, cal/g) | 1.6 | 1.9 | 1.7 | 1.7 | 2 | 2 |
| Relative Crystallinity (Hf − Hc, cal/g) | 9.6 | 8.6 | 8.4 | 6.1 | 3.9 | 2.4 |

*As referred to herein, "crystallinity" is calculated as the heat of fusion minus the heat of crystallization; in those cases where this value is greater than 8; this value corresponds to a composition which is sufficiently crystalline so as to be recyclable in the context of the present disclosure.

Examples 13-16

Tenter frame film samples were made on a commercial tenter frame to create enough material to evaluate using the APR test procedure for compatibility with the recycling process. In this commercial tenter frame process, resins were dried, blended, extruded into 10 mil films and then stretched directly on a tenter frame. The resin compositions used to make these blends are described in Table 6. The blend combinations used to make these shrinkable films are shown in Table 7. Film properties of those blends are shown in Table 8.

TABLE 6

| Resin # | 4 | 5 | 6 | 7 | 8 | 9 | 10 |
|---|---|---|---|---|---|---|---|
| PTA content (mole %) | 100 | 100 | 100 | 100 | 100 | 100 | 100 |
| EG content (mole %) | 70 | 88 | 93 | 67 | 63 | 65 | 82 |
| NPG (mole %) | 27 | 0 | 0 | 0 | 0 | 0 | 11 |
| CHDM (mole %) | 0 | 5 | 4 | 23 | 0 | 23 | 3 |
| DEG content (mole %) | 3 | 7 | 3 | 10 | 37 | 12 | 4 |
| Total Amorphous Monomer Content | 30 | 12 | 7 | 33 | 37 | 35 | 18 |

TABLE 7

| Blend Components | Blend #13 | Blend #14 | Blend #15 | Blend #16 | Resin #10 |
|---|---|---|---|---|---|
| 9 | 15 | | | | |
| 4 | 47 | 60 | | 40 | |
| 8 | 15 | | | 4 | |
| 6 | 23 | | | 36 | 10 |
| 5 | | 40 | | | |
| 7 | | | | 20 | |
| 10 | | | 90 | | 100 |

TABLE 8

| Measured Shrink Film properties | Blend #13 | Blend #14 | Blend #15 | Blend #16 | Resin #10 |
|---|---|---|---|---|---|
| PTA content (mole %) | 100 | 100 | 100 | 100 | 100 |
| EG content (mole %) | 75 | 78 | 79 | 82 | 80 |
| NPG (mole %) | 13 | 16 | 8 | 10 | 11 |
| CHDM (mole %) | 3 | 2 | 7 | 3 | 3 |
| DEG content (mole %) | 9 | 4 | 6 | 5 | 5 |
| TEG content (mole %) | 0 | 0.1 | 0 | 0.3 | 0.3 |
| Total Amorphous Monomer Content | 25 | 22 | 21 | 18 | 19 |
| Tg (° C.) | 74 | 75 | 73 | 74 | 74 |
| Strain induced crystalline melting point (° C.) | 233 | 222 | 234 | 210 | 203 |
| % clumping (410F, no load) | 0.55 | 0.12 | 0.30 | 0.01 | 0.08 |
| % clumping (420F, no load) | N/M | 0.26 | 0.58 | 0.07 | 0.14 |
| Ultimate shrinkage (% at 95° C.) | 77 | 75 | 71 | 71 | 73 |
| MD Shrinkage @ 70° C. (%) | 3 | 5 | 7 | 6 | 7 |
| Shrink Force (MPa) | 11.0 | 10.6 | 10.3 | 10.5 | 10.3 |

Films made with these blends have excellent shrinkable film properties and high strain induced crystalline melting points. The strain induced crystalline melting points for these compositions were all greater than 200° C. Typically, the strain induced crystalline melting point must be >200° C. to withstand the drying temperature for PET and remain free-flowing. The strain induced crystalline melting points of these resin blends are much higher than is possible from reactor grade materials made with the same compositions. This high strain induced crystalline melting point would be advantageous in applications where higher melting points are required. For example, if the PET flake is dried at a temperature higher than the APR test temperature (420 F or 210° C. for example) the label does not become sticky and can still be recycled with PET. These films were tested for their compatibility relative to the recycling process (results are shown in Table 11). Film made with these compositions passed the lower and a higher drying temperature and are therefore considered compatible with the recycling process (target <1% clumping is considered compatible with the recycling process).

This disclosure has been described in detail with particular reference to preferred embodiments thereof, but it will be understood that variations and modifications can be effected within the spirit and scope of the disclosure.

What is claimed:

1. A blend composition comprising a blend of polyesters comprising:
   (1) 5-50 weight % of a first polyester which comprises:
      (a) a dicarboxylic acid component comprising:
         (i) about 70 to about 100 mole % of terephthalic acid residues;
         (ii) about 0 to about 30 mole % of aromatic and/or aliphatic dicarboxylic acid residues having up to 20 carbon atoms; and
      (b) a diol component comprising:
   about 60 mole % or greater of ethylene glycol residues and about 40 mole % or less of other glycols comprising one or more of:
         (i) about 20 to less than about 30 mole % of neopentyl glycol residues;
         (ii) about 2 to less than about 10 mole % of total diethylene glycol residues;
   wherein the total mole % of the dicarboxylic acid component is 100 mole %, and wherein the total mole % of the diol component is 100 mole %;
   and
   (2) 50-95 weight % of a second polyester which comprises:
      (a) a dicarboxylic acid component comprising:
         (i) about 70 to about 100 mole % of terephthalic acid residues;
         (ii) about 0 to about 30 mole % of aromatic and/or aliphatic dicarboxylic acid residues having up to 20 carbon atoms; and
      (b) a diol component comprising:
   about 60 mole % or greater of ethylene glycol residues and about 40 mole % or less of other glycols comprising one or more of:
         (i) about 2 to less than about 25 mole % of 1,4-cyclohexanedimethanol residues;
         (ii) about 5 to less than about 15 mole % of total diethylene glycol residues,
   wherein the total mole % of the dicarboxylic acid component is 100 mole %, and wherein the total mole % of the diol component is 100 mole %,
   wherein (1) and (2) are different,
   wherein the composition exhibits a strain induced crystalline melting point of greater than 190° C. measured on the $1^{st}$ heat of a DSC scan according to ASTM when (i) extruded into a 250 micron film and (ii) stretched on a tenter frame to a 5:1 stretch ratio and a final thickness of 50 micron at a temperature to Tg+5° C. to Tg+15° C.

2. The composition of claim 1, wherein the composition has a crystalline melting point of about 200 to about 255° C.; or wherein the heat of fusion of the composition minus the heat of crystallization is greater than about 8.0.

3. A film comprising the composition of claim 1, wherein the film exhibits shrinkage in the transverse direction of 65% or greater when (i) extruded into a 250 micron film, (ii) stretched on a tenter frame to 5:1 stretch ratio at a temperature to Tg+5° C. to Tg+15° C. and final thickness of 50 micron, (iii) cut into 50 mm by 50 mm square sample, and (iv) immersed in water at 95° C. for 10 seconds.

4. A thermoformed sheet having a thickness of from about 0.25 mm to about 6.4 mm, comprising the composition of claim 1.

5. An article prepared from the thermoformed sheet of claim 4.

6. A polyester recycle stream comprising the composition of claim 1.

* * * * *